(12) United States Patent
Hotta

(10) Patent No.: US 10,214,196 B2
(45) Date of Patent: Feb. 26, 2019

(54) HYBRID VEHICLE

(71) Applicant: Toyota Jidosha Kabushiki Kaisha, Toyota-shi Aichi-ken (JP)

(72) Inventor: Makoto Hotta, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 70 days.

(21) Appl. No.: 15/063,671

(22) Filed: Mar. 8, 2016

(65) Prior Publication Data

US 2016/0264124 A1    Sep. 15, 2016

(30) Foreign Application Priority Data

Mar. 9, 2015    (JP) .................................. 2015-045673

(51) Int. Cl.

| | |
|---|---|
| *B60W 20/13* | (2016.01) |
| *B60W 10/08* | (2006.01) |
| *B60K 6/442* | (2007.10) |
| *B60W 10/06* | (2006.01) |
| *B60K 6/445* | (2007.10) |

(Continued)

(52) U.S. Cl.
CPC ............. *B60W 10/08* (2013.01); *B60K 6/445* (2013.01); *B60W 10/06* (2013.01); *B60W 20/12* (2016.01); *B60W 50/0097* (2013.01); *B60W 2550/141* (2013.01); *B60W 2550/402* (2013.01); *B60W 2710/244* (2013.01); *B60Y 2300/182* (2013.01); *B60Y 2300/91* (2013.01); *B60Y 2300/92* (2013.01); *Y02T 10/6239* (2013.01); *Y02T 10/6269* (2013.01); *Y02T 10/6291* (2013.01); *Y10S 903/93* (2013.01)

(58) Field of Classification Search
None
See application file for complete search history.

(56) References Cited

U.S. PATENT DOCUMENTS

| | | |
|---|---|---|
| 6,201,312 B1 | 3/2001 | Shioiri et al. |
| 2009/0319110 A1* | 12/2009 | Tani .......................... B60K 6/48 701/22 |

(Continued)

FOREIGN PATENT DOCUMENTS

| | | |
|---|---|---|
| JP | H11229916 A | 8/1999 |
| JP | 2003-237392 A | 8/2003 |

(Continued)

*Primary Examiner* — Abby Y Lin
*Assistant Examiner* — Kyung J Kim
(74) *Attorney, Agent, or Firm* — Dinsmore & Shohl LLP

(57) ABSTRACT

The electronic control unit sets a target value of a charging amount of the electrical storage device and increases the charging amount to the target value during traveling on the freeway. The electronic control unit computes a first travel cost being cost per unit travel distance of fuel used when the EV travel is made by using the electric power charged in the electrical storage device at a time when the HV travel is made on the freeway, and the second travel cost being cost per unit travel distance of the electric power used when the EV travel is made by using the electric power charged in the electrical storage device by the charging mechanism at the destination. The electronic control unit sets the target value on the basis of a comparison result between the first travel cost and the second travel cost.

4 Claims, 14 Drawing Sheets

(51) Int. Cl.
B60W 50/00 (2006.01)
B60W 20/12 (2016.01)

(56) References Cited

U.S. PATENT DOCUMENTS

| | | | | |
|---|---|---|---|---|
| 2010/0204863 A1* | 8/2010 | Sakamoto | ............. | B60W 20/12 701/22 |
| 2011/0010030 A1* | 1/2011 | Yamamoto | ............ | B60W 20/13 701/22 |
| 2014/0018985 A1* | 1/2014 | Gupta | ................ | B60W 20/104 701/22 |

FOREIGN PATENT DOCUMENTS

| JP | 2007-237792 A | 9/2007 |
|---|---|---|
| JP | 2009-279989 A | 12/2009 |
| JP | 2011-000915 A | 1/2011 |
| JP | 2013-177089 A | 9/2013 |

* cited by examiner

| TRAVEL MODE | TRAVEL ROAD | TRAVEL COST [YEN/km] |
|---|---|---|
| TRAVEL IN CS MODE | FREEWAY | A1 |
|  | OPEN ROAD | A2 |
| EV TRAVEL BY CHARGED ELECTRIC POWER ON FREEWAY | FREEWAY | B1 |
|  | OPEN ROAD | B2 |
| EV TRAVEL BY CHARGED ELECTRIC POWER AT CHARGING STATION | FREEWAY | C1 |
|  | OPEN ROAD | C2 |
| EV TRAVEL BY CHARGED ELECTRIC POWER AT HOME | FREEWAY | D1 |
|  | OPEN ROAD | D2 |

HYBRID VEHICLE

CROSS-REFERENCE TO RELATED APPLICATIONS

This application claims priority to Japanese Patent Application No. 2015-045673 filed on Mar. 9, 2015, the entire contents of which are hereby incorporated by reference.

BACKGROUND

1. Field

The disclosure relates to a hybrid vehicle in which an on-board electrical storage device can be charged by a power supply on the outside of the vehicle.

2. Description of Related Art

Japanese Patent Application Publication No. 2011-915 (JP 2011-915 A) discloses a hybrid vehicle that includes: an engine that generates power by using fuel; a battery that can be charged externally; and a motor generator that generates power by using electric power supplied from said battery. This hybrid vehicle is configured to control a drive ratio between the engine and the motor generator with respect to requested drive power such that the drive ratio of either the engine or the motor generator that can produce a higher economic effect is increased in accordance with unit distance fuel cost that is a unit price of the fuel reserved in the vehicle after refueling per unit distance and unit distance electric power cost that is a unit price of the electric power stored in the battery after electrical charging of the battery by external charging per unit distance.

In JP 2011-915 A, in the above configuration, an EV travel region in which the vehicle travels only by drive power of the motor generator is increased or decreased in accordance with a result of comparison of a magnitude between the unit distance fuel cost and the unit distance electric power cost. Alternatively, in accordance with the above comparison result, a cooperative travel region of the engine and the motor generator is increased or decreased, and the drive ratio between the engine and the motor generator in the cooperative travel region is changed.

In the hybrid vehicle as described above, engine output is appropriately controlled in order to control a state of charge (hereinafter also abbreviated as an SOC) of the battery to be an SOC target value. Energy efficiency (hereinafter also referred to as "charging efficiency") of the increased SOC with respect to fuel consumption at this time is changed in accordance with an engine operation point that is defined by a combination of an engine speed and engine torque.

For example, in the case where an operation point at which power required for traveling of the vehicle is output is located on a low output side from an operation point at which engine efficiency becomes the maximum, the engine efficiency is improved by adding power for charging of the battery during charging by SOC control. In such a case, there is a possibility that charging cost of the battery by the engine output is lower than charging cost thereof by external charging.

Accordingly, it is considered that a total travel cost of the hybrid vehicle is rather increased in the case where the engine efficiency during the charging by the SOC control as described above is not taken into consideration and the external charging is uniformly performed.

SUMMARY

The present specification discloses a configuration that reduces a total travel cost in a hybrid vehicle in which an on-board electrical storage device can be charged by a power supply on the outside of the vehicle.

In an aspect, the hybrid vehicle includes: an internal combustion engine; the electrical storage device; a motor mechanically coupled to a drive wheel and generating travel drive power by receiving the electric power from the electrical storage device; an electric power generator mechanically coupled to the internal combustion engine and generating electric power to be charged to the electrical storage device by using power of the internal combustion engine; a charging mechanism for charging the electrical storage device by using the electric power from a power supply on the outside of the vehicle; and an electronic control unit. The electronic control unit switches between an EV travel in which the internal combustion engine is stopped and the vehicle travels by using output of the motor and an HV travel in which the vehicle travels by actuating the internal combustion engine for traveling in accordance with a travel situation of the vehicle. The electronic control unit is configured to execute charging amount recovery control for setting a target value of a charging amount of the electrical storage device and increasing the charging amount of the electrical storage device to the target value during traveling on the freeway. The target value is a target value at a time when the vehicle passes an exit of a freeway in the case where a travel route to a destination includes the freeway and an open road from the exit of the freeway to the destination. The electronic control unit computes a first travel cost and a second travel cost, the first travel cost being cost per unit travel distance of fuel used when the EV travel is made by using the electric power charged in the electrical storage device at a time when the HV travel is made on the freeway, and the second travel cost being cost per unit travel distance of the electric power used when the EV travel is made by using the electric power charged in the electrical storage device by the charging mechanism at the destination. The electronic control unit further compares the first travel cost and the second travel cost and sets a target value in the charging amount recovery control on the basis of a comparison result.

According to the above hybrid vehicle, an SOC value of the electrical storage device is increased by executing the electrical storage amount recovery control, by which charging efficiency of the electrical storage device can be increased, during traveling on the freeway, and the EV travel is made on the open road by using the electric power stored in the electrical storage device. In this way, compared to a case where the hybrid vehicle travels on the open road while an SOC is maintained in a specified level, a travel cost can be reduced. Furthermore, the target value in the charging amount recovery control that is executed during traveling on the freeway is set on the basis of the comparison result between the first travel cost and the second travel cost. In this way, charging cost of the hybrid vehicle can be reduced. As a result, a total travel cost of the hybrid vehicle can be reduced.

In some embodiments, in the case where the first travel cost is higher than the second travel cost, the electronic control unit sets the target value such that an electric power amount required to make the EV travel on the open road is stored in the electrical storage device when the vehicle passes the exit of the freeway.

When it is configured as described above, in the case where the first travel cost is higher than the second travel cost, the SOC of the electrical storage device at the destination is recovered to a full charge state by external charging. In this way, the charging cost of the electrical storage device can be reduced. Thus, the total travel cost of the hybrid vehicle can be reduced.

In some embodiments, in the case where the first travel cost is lower than the second travel cost, the electronic control unit sets the target value such that the electrical storage device is brought into the specified full charge state when the vehicle passes the exit of the freeway.

When it is configured as described above, in the case where the first travel cost is lower than the second travel cost, a larger electric power amount than an electric power amount required for the travel on the open road is stored in the electrical storage device. In this way, an electric power amount that is charged by the external charging at the destination can be reduced. In this way, the charging cost can be reduced. Thus, the total travel cost of the hybrid vehicle can be reduced.

In some embodiments, in the case where the first travel cost is equal to the second travel cost, the electronic control unit executes the charging amount recovery control when the vehicle travels on the freeway and when the internal combustion engine is operated at an operation point at which energy efficiency of the internal combustion engine becomes at least equal to a specified threshold.

When it is configured as described above, the charging amount recovery control is executed when the engine is operated at the engine operation point at which the charging efficiency of the electrical storage device is increased in the case where the first travel cost is equal to the second travel cost. As a result, the travel cost at a time when the EV travel is made by using the electric power that is charged on the freeway can be reduced. In this way, the total travel cost of the hybrid vehicle can be reduced.

In some embodiments, the hybrid vehicle further includes a switching unit that is controlled to be in either a coupling state in which a mechanical power transmission path between the internal combustion engine and the drive wheel is established or a blocking state in which said power transmission path is blocked. The electronic control unit controls the switching unit to be in the blocking state in the EV travel and switches between a series HV travel and a parallel HV travel in the HV travel. The series HV travel is a mode in which the switching unit is controlled to be in the blocking state, the internal combustion engine is actuated, and the vehicle thereby travels by using output of the motor in conjunction with electric power generation by the electric power generator. The parallel HV travel is a mode in which the switching unit is controlled to be in the coupling state, the internal combustion engine is actuated, and the vehicle thereby travels by using at least some of output of the internal combustion engine. The electronic control unit executes the charging amount recovery control by selecting the parallel HV travel during traveling on the freeway, and computes, as the first travel cost, cost per unit travel distance of the fuel used when the EV travel is made by using the electric power charged in the electrical storage device at a time when the parallel HV travel is made on the freeway.

When it is configured as described above, the SOC value of the electrical storage device is increased by executing the electrical storage amount recovery control during selection of the parallel HV travel in which the charging efficiency of the electrical storage device can be increased, and the EV travel is made on the open road by using the electric power stored in the electrical storage device. In this way, the travel cost can be reduced. Furthermore, the target value in the charging amount recovery control that is executed during selection of the parallel HV travel is set on the basis of a comparison result between the first travel cost and the second travel cost. In this way, the charging cost of the hybrid vehicle can be reduced. As a result, the total travel cost of the hybrid vehicle can be reduced.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
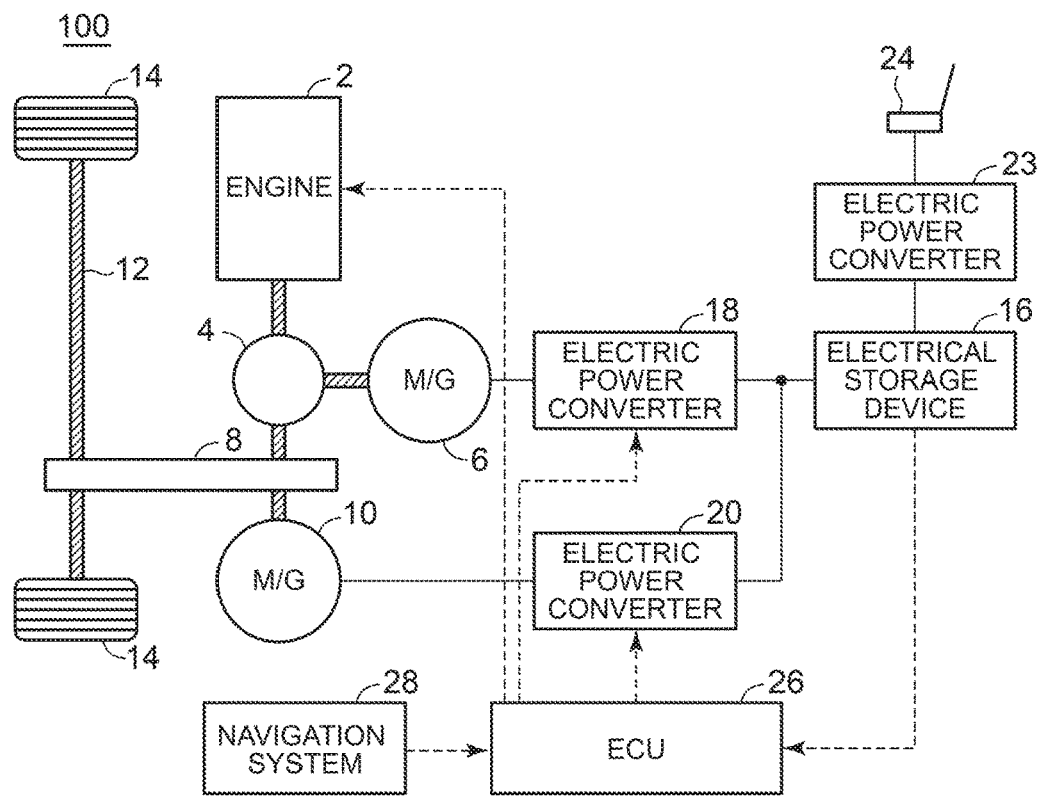
FIG. 1 is a block diagram for showing an overall configuration of a hybrid vehicle according to a first embodiment.

A detailed description will hereinafter be made on embodiments with reference to the drawings. It should be noted that the same or corresponding portions in the drawings are denoted by the same reference numerals and a description thereon will not be repeated.

FIG. 1 is a block diagram for explaining an overall configuration of a hybrid vehicle according to a first embodiment.

With reference to FIG. 1, a hybrid vehicle 100 includes an engine 2, a power split device 4, motor generators 6, 10, a transmission gear 8, a drive shaft 12, and drive wheels 14. The hybrid vehicle 100 further includes an electrical storage device 16, electric power converters 18, 20, 23, a connection section 24, and an electronic control unit (ECU) 26.

The engine 2 is an internal combustion engine that outputs power by converting thermal energy produced from combustion of fuel into kinetic energy of motion elements such as a piston and a rotor. In some embodiments, the fuel of the engine 2 is hydrocarbon fuel such as gasoline, diesel gasoline, ethanol, liquid hydrogen, and natural gas or hydrogen fuel in liquid or gas.

The motor generators 6, 10 are each an AC rotary electric machine and, for example, constructed of a three-phase AC synchronous electric motor. The motor generator 6 is used as an electric power generator that is driven by the engine 2 through the power split device 4, and is also used as a motor for starting the engine 2. The motor generator 10 is mainly operated as a motor and drives the drive shaft 12. Meanwhile, the motor generator 10 is operated as an electric power generator to perform regenerative braking during braking of the vehicle or during a reduction in acceleration on a descending slope. The motor generator 6 corresponds to one example of the "electric power generator", and the motor generator 10 corresponds to one example of the "motor". In addition, the power split device 4 includes a planetary gear mechanism that has three rotational shafts of a sun gear, a carrier, and a ring gear, for example. The power split device 4 splits drive power of the engine 2 into power transmitted to a rotational shaft of the motor generator 6 and power transmitted to the transmission gear 8. The transmission gear 8 is coupled to the drive shaft 12 for driving the drive wheels 14. The transmission gear 8 is also coupled to a rotational shaft of the motor generator 10.

The electrical storage device 16 is a DC power supply that can be recharged, and is constructed of a secondary battery such as a nickel hydrogen battery or a lithium-ion battery. The electrical storage device 16 supplies electric power to the electric power converters 18, 20. In addition, the electrical storage device 16 is charged by receiving generated electric power when the motor generator(s) 6 and/or 10 generate(s) the electric power. Furthermore, the electrical storage device 16 is charged by receiving electric power that is supplied from a power supply (not shown) on the outside of the vehicle that is electrically connected to the connection section 24 when the electrical storage device 16 is charged by the power supply on the outside of the vehicle (hereinafter, the power supply on the outside of the vehicle that is electrically connected to the connection section 24 is also referred to as an "external power supply", and charging of the electrical storage device 16 by the external power supply is also referred to as "external charging"). It should be noted that a large-capacity capacitor can also be adopted as the electrical storage device 16.

It should be noted that a charging state of the electrical storage device 16 is indicated by a state of charge (an SOC) that expresses a current electrical storage amount with respect to a full charge state of the electrical storage device 16 in percentage. The full charge state is a state that the electrical storage device 16 is charged in a predetermined maximum charged amount. The predetermined maximum charged amount may change by condition of the electrical storage device 16 or outside of the electrical storage device 16. The SOC is computed on the basis of an output voltage and/or an input/output current of the electrical storage device 16 detected by a voltage sensor and/or a current sensor, which are not shown, for example. The SOC may be computed by an ECU that is separately provided to the electrical storage device 16 or may be computed by the ECU 26 on the basis of a detection value(s) of the output voltage and/or the input/output current of the electrical storage device 16.

The electric power converter 18 performs bi-directional DC/AC power conversion between the motor generator 6 and the electrical storage device 16 on the basis of a control signal received from the ECU 26. Similarly, the electric power converter 20 performs bi-directional DC/AC power conversion between the motor generator 10 and the electrical storage device 16 on the basis of a control signal received from the ECU 26. In this way, the motor generators 6, 10 can each output positive torque for being operated as the motor or negative torque for being operated as the generator in conjunction with transmission/reception of the electric power to/from the electrical storage device 16. It should be noted that a boosting converter for DC voltage conversion may be arranged between the electrical storage device 16 and the electric power converters 18, 20.

The electric power converter 23 converts the electric power, which is supplied from the external power supply through the connection section 24, to be in a voltage level of the electrical storage device 16 and outputs the electric power to the electrical storage device 16 on the basis of a control signal received from the ECU 26 during the external charging by the external power supply.

The ECU 26 includes a central processing unit (CPU), a memory, an input/output buffer, and the like (none of them is shown), and outputs a signal for controlling each equipment of the hybrid vehicle 100 on the basis of signal input from various sensors and operation input by a driver. It should be noted that these types of control can not only be processed by software but can also be processed by dedicated hardware (an electronic circuit).

As main control by the ECU 26, the ECU 26 computes power required for traveling (hereinafter also referred to as "travel power") on the basis of an accelerator operation amount and a vehicle speed in accordance with an operation of an accelerator pedal and controls the engine 2 and the motor generators 6, 10 such that the hybrid vehicle 100 generates the computed travel power.

When the travel power is small, the ECU 26 controls the vehicle such that the engine 2 is stopped and the vehicle travels only by the motor generator 10 (an EV travel). When the travel power is increased in accordance with the operation of the accelerator pedal, or when the SOC of the electrical storage device 16 is decreased, the ECU 26 controls the vehicle such that the engine 2 is actuated and the vehicle thereby travels (an HV travel). In the HV travel, the hybrid vehicle 100 travels by using the drive power of the engine 2 in addition to the drive power of the motor generator 10, or instead of the motor generator 10. The electric power that is generated by the motor generator 6 in conjunction with actuation of the engine 2 is stored in the electrical storage device 16 or is directly supplied to the motor generator 10.

In addition, the ECU 26 executes travel control for controlling a vehicle travel by selectively applying a charge depleting (CD) mode in which the SOC is consumed and a charge sustaining (CS) mode in which the SOC is maintained in a specified level.

Figure 2:
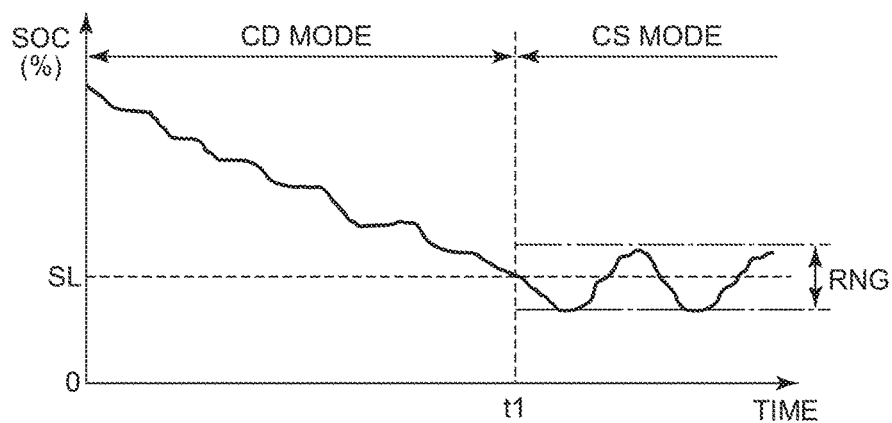
FIG. 2 is a chart for explaining a CD mode and a CS mode.

FIG. 2 is a chart for explaining the CD mode and the CS mode. With reference to FIG. 2, for example, after the electrical storage device 16 is brought into the full charge state by the external charging, the CD mode is selected, and the vehicle starts traveling.

The CD mode is a mode in which the SOC is consumed, and is basically a mode in which the electric power (mainly electrical energy by the external charging) stored in the electrical storage device 16 is consumed. During traveling in the CD mode, the engine 2 is not actuated to maintain the SOC. Thus, although there is a case where the SOC is temporarily increased by regenerative electric power that is collected during deceleration of the vehicle and the like or by the electric power that is generated in conjunction with the actuation of the engine 2 caused by the increased travel power, a discharging ratio is relatively larger than a charging ratio as a result, and overall, the SOC is decreased in conjunction with an increased travel distance.

The CS mode is a mode in which the SOC is maintained in the specified level. As one example, when the SOC is decreased to a specified value SL that indicates a decrease in the SOC at time t1, the CS mode is selected, and thereafter, the SOC is maintained to be within a control range RNG that is determined on the basis of the specified value SL. More specifically, the SOC is controlled to be within the control range RNG when the engine 2 is appropriately and repeatedly actuated and stopped (an intermittent operation). Just as described, in the CS mode, the engine 2 is actuated to maintain the SOC.

It should be noted that, although not particularly shown, a switch that can be operated by the driver may be provided so as to be able to switch between the CD mode and the CS mode in accordance with an operation by the driver that is irrespective of a transition of the SOC.

In this hybrid vehicle 100, the EV travel is selected when a sum of travel power Pr* and charging/discharging requested power Pchg to the electrical storage device 16 is smaller than a specified engine start threshold. On the other hand, when the sum of the travel power Pr* and the charging/discharging requested power Pchg exceeds the engine start threshold, the engine 2 is started, and the HV travel is thereby selected. In some embodiments, the engine start threshold in the CD mode is set larger than the engine start threshold in the CS mode.

As described above, the engine 2 is also started in the CD mode when the travel power is increased in accordance with an accelerator operation by the driver or the like. When the travel power is decreased after the actuation of the engine 2, the engine 2 is stopped again.

Meanwhile, the engine start for the SOC control is avoided in the CD mode. For example, the charging/discharging requested power Pchg is set to 0 in the CD mode. It should be noted that, even when the travel power is small in the CD mode, there is a case where the actuation of the engine 2 is permitted, such as a time at which hot-water heating with the engine 2 as a heat source is requested or a time at which the engine 2 is warmed.

In the CS mode, in order to maintain the SOC to be within the control range RNG, the SOC control is executed by adjusting output of the engine 2. For example, in the CS mode, a start of the engine 2 is requested in accordance with the decrease in the SOC in addition to the travel power. Meanwhile, the engine 2 is also stopped in the CS mode when the sum of the travel power and the charging/discharging requested power is smaller than the engine start threshold.

As described above, in the hybrid vehicle 100, the CD mode is not limited to the EV travel in which the hybrid vehicle 100 travels while the engine 2 is constantly stopped. In addition, the CS mode is not limited to the HV travel in which the hybrid vehicle 100 travels while the engine 2 is constantly actuated. The EV travel and the HV travel are possible in any of the CD mode and the CS mode.

It should be noted that, basically, the hybrid vehicle 100 effectively uses the electrical energy stored in the electrical storage device 16 by increasing frequencies of the EV travel in the CD mode and thereby improves energy efficiency (fuel economy).

With reference to FIG. 1 again, the hybrid vehicle 100 further includes a navigation system 28. The navigation system 28 is configured to be communicable with the outside of the vehicle and can grasp host vehicle position information, that is, a current spot of the hybrid vehicle 100 by using a global positioning system (GPS) that measures a vehicle position by using a satellite. In addition, the navigation system 28 reads roadmap data that is stored in a non-volatile memory such as a hard disk drive (HDD), which is not shown, combines the grasped host vehicle position information with the roadmap data, and can thereby provide travel guide. For example, the host vehicle position of the vehicle can be displayed in a display section, which is not shown, by placing the host vehicle position on the roadmap data.

In addition, when a destination is set by a user, the navigation system 28 searches a travel route from the current spot to the destination and can guide the route on the display section, which is not shown. Furthermore, the navigation system 28 is typically configured to have a function of storing travel history of the hybrid vehicle 100. Thus, past travel history and the like can be learned for each road. Moreover, when information of home, an office, and the like are registered in the navigation system 28, a particular region (for example, a region within a certain distance from a particular destination) can be recognized from a relationship with such a particular destination.

Figure 3:
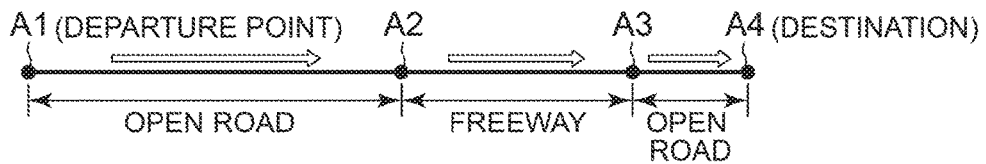
FIG. 3 is a view for schematically showing one example of a route on which the hybrid vehicle travels.

Next, the travel control of the hybrid vehicle 100 will specifically be described with reference to FIG. 3 to FIG. 5. FIG. 3 schematically shows one example of a route on which the hybrid vehicle 100 travels. FIG. 3 shows one example of such a travel route that the travel control of the hybrid vehicle according to the first embodiment is executed.

As shown by arrows in FIG. 3, the hybrid vehicle 100 travels in an order of a point A1→a point A2→a point A3→a point A4. The point A1 is a departure point, the point A4 is a destination point, and the points A2, A3 are passing points. It should be noted that a section from the point A1 to the point A2 is an open road, a section from the point A2 to the point A3 is a freeway, and a section from the point A3 to the point A4 is an open road.

Figure 4:
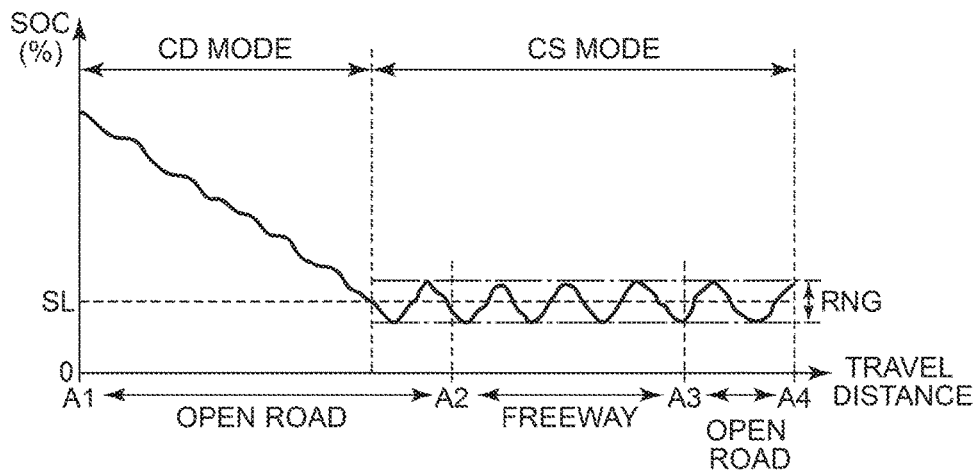
FIG. 4 is a schematic waveform chart for showing one example of transitions of the modes and an SOC when the hybrid vehicle travels on the route shown in FIG. 3.

FIG. 4 is a schematic waveform chart for showing one example of the transitions of the modes and the SOC of the electrical storage device 16 when the hybrid vehicle 100 travels on the route as shown in FIG. 3. In FIG. 4, a horizontal axis indicates a travel distance, and a vertical axis indicates the SOC.

As shown in FIG. 4, for example, the mode (the travel mode) is selected on the basis of the SOC. More specifically, the CD mode is selected when the SOC is higher than the specified value SL. Meanwhile, in the case where the SOC is decreased to be lower than the specified value SL when the CD mode is selected, the CS mode is selected.

In the example of FIG. 4, the electrical storage device 16 is charged to a full-charge level by the external charging at the departure point A1. Furthermore, because the SOC>SL, the CD mode is selected, and traveling is started. In the CD mode, the SOC is gradually decreased in conjunction with an increase in the travel distance. Then, when the SOC<SL, the hybrid vehicle 100 is switched from the CD mode to the CS mode. Thus, as shown in FIG. 4, in the case where the hybrid vehicle 100 is switched to the CS mode in the section from the point A1 to the point A2, the hybrid vehicle 100 travels in the CS mode in each of the section from the point A2 to the point A3 (the freeway) and the section from the point A3 to the point A4 (the open road). That is, the intermittent operation of the engine 2 is performed so as to maintain the SOC to be within the control range RNG.

It should be noted that, although not shown, in the case where the hybrid vehicle 100 reaches the destination point A4 and the traveling is finished, the user connects the external power supply to the connection section 24, and the external charging is thereby started. The SOC of the electrical storage device 16 starts being increased by the external charging. When the SOC reaches the full-charge level, the external charging is completed, and a state at the departure point A1 is recreated.

Figure 5:
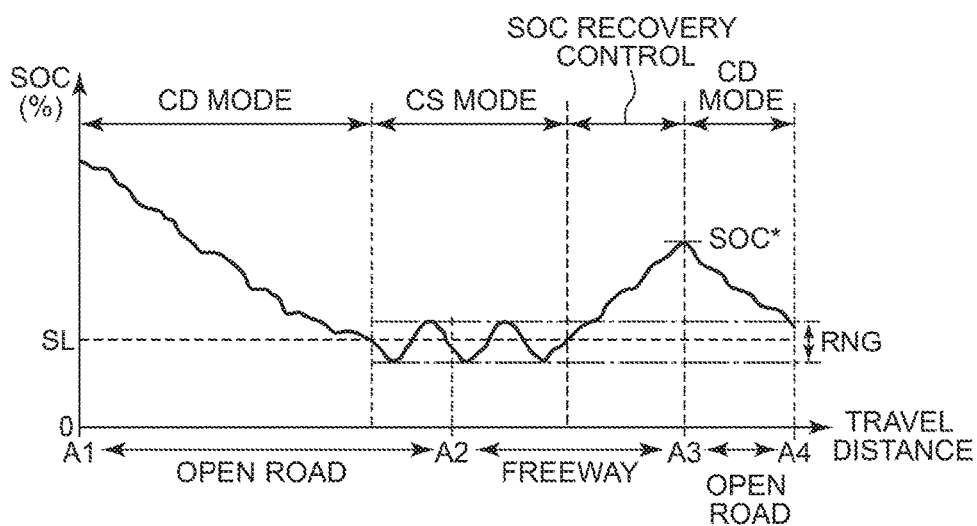
FIG. 5 is a schematic waveform chart for showing another example of the transitions of the modes and the SOC when the hybrid vehicle travels on the route shown in FIG. 3.

FIG. 5 shows another example of the transitions of the modes and the SOC when the hybrid vehicle 100 travels on the route as shown in FIG. 3. In FIG. 5, a horizontal axis indicates the travel distance, and a vertical axis indicates the SOC.

With reference to FIG. 5, similar to FIG. 4, the CD mode is selected and traveling is started at the departure point A1. When the SOC<SL in the section from the point A1 to the point A2 during traveling in the CD mode, the hybrid vehicle 100 is switched from the CD mode to the CS mode.

In the section from the point A2 to the point A3 (the freeway), the hybrid vehicle 100 travels in the CS mode. As shown in FIG. 5, SOC recovery control for increasing the SOC of the electrical storage device 16 to a target value is executed during traveling in the CS mode. In the SOC recovery control, the target value in the SOC control (hereinafter referred to as a target SOC) is increased to be higher than that in the CS mode (an SOC recovery control non-execution time). The SOC recovery control differs from the CS mode in a point that the hybrid vehicle 100 is limited to the HV travel, in which the hybrid vehicle 100 travels while the engine 2 is constantly actuated, in order to forcibly increase the SOC.

During traveling on the freeway, the ECU 26 executes the SOC recovery control. In the SOC recovery control, the engine 2 is constantly actuated such that the SOC reaches the target SOC (an SOC*) when the hybrid vehicle 100 passes the point A3 as an exit of the freeway.

Then, because the SOC (=the SOC*)>SL at the point A3 as the exit of the freeway, the CD mode is selected again. Accordingly, the hybrid vehicle 100 travels in the CD mode when passing the point A3 onward. Thus, the SOC is gradually decreased again. When the SOC<SL again, the hybrid vehicle 100 is switched from the CD mode to the CS mode. In the example of FIG. 5, because the SOC>SL is maintained in the section from the point A3 to the destination point A4 (the open road), the hybrid vehicle 100 travels in the CD mode. That is, because the actuation of the engine 2 for charging the electrical storage device 16 is avoided during traveling in the section from the point A3 to the point A4 (the open road), the frequencies of the EV travel are increased.

As it is understood from FIG. 4 and FIG. 5, in the case where the hybrid vehicle 100 travels on a road as shown in FIG. 2 that sequentially includes the freeway and the open road, in addition to a travel pattern in which the hybrid vehicle 100 travels on the freeway and the open road in the CS mode (see FIG. 4), a travel pattern in which the SOC recovery control is executed during traveling on the freeway and the hybrid vehicle 100 travels on the open road in the CD mode (see FIG. 5) is available.

According to the latter travel pattern, the engine 2 is actively actuated during traveling on the freeway, and an SOC value of the electrical storage device 16 is increased. In this way, the hybrid vehicle 100 can make the EV travel on the open road by using the electric power stored in the electrical storage device 16.

Here, a travel cost at a time when the hybrid vehicle 100 travels on the open road in the CS mode and a travel cost at a time when the hybrid vehicle 100 makes the EV travel on the open road by using the electric power that is stored during traveling on the freeway are compared. In the following description, the "travel cost" indicates cost of the fuel per unit travel distance or cost of the electric power supplied from the external power supply per unit travel distance. The travel cost is cost that is required to travel a distance of 1 km, that is, represented by unit of [yen/km].

In the above comparison, the travel cost at the time when the hybrid vehicle 100 makes the EV travel on the open road by using the electric power that is stored during traveling on the freeway tends to be lower than the travel cost at the time when the hybrid vehicle 100 travels on the open road in the CS mode. This is because the energy efficiency (charging efficiency) for charging the electrical storage device 16 is higher during high-speed traveling than that during middle or low-speed traveling. In other words, a ratio of a fuel consumption amount that is used for charging of the electrical storage device 16 to an overall fuel consumption amount is higher during the high-speed traveling than that during the middle or low-speed traveling.

A first reason why the charging efficiency is increased during traveling on the freeway is that, noise in a circumferential environment is larger during traveling on the freeway than that during traveling on the open road, so an operation point of the engine 2 can easily approach an optimum fuel economy operation point (corresponding to a point PO in FIG. 6) at which thermal efficiency of the engine 2 has a maximum value, that is, at which engine efficiency becomes the maximum.

Figures 6, 7:
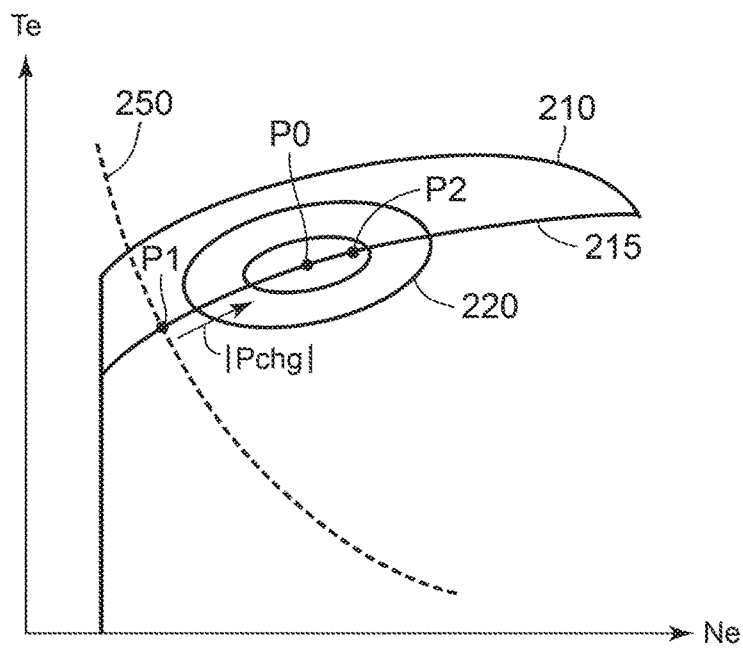
FIG. 6 is a chart for explaining a relationship between SOC control and engine output control.
FIG. 7 is a table for explaining a computation method of a travel cost in each travel mode when the hybrid vehicle travels on a freeway and an open road.

A relationship between the SOC control and output control of the engine 2 will be described by using FIG. 6. With reference to FIG. 6, a horizontal axis of FIG. 6 indicates an engine speed Ne, and a vertical axis of FIG. 6 indicates engine torque Te. As shown in FIG. 6, the operation point of the engine 2 is defined by a combination of the engine speed and the engine torque.

In FIG. 6, a maximum torque line 210 and a constant fuel economy line 220 of the engine 2 are shown. The maximum torque line 210 is defined in advance as a set of operation points at each of which the engine 2 outputs the maximum torque that can be output at each of the engine speeds. The constant fuel economy line 220 indicates a set of operation points at which the fuel economy is the same and draws an oval. The plural constant fuel economy lines indicate that the fuel economy is improved as the operation point approaches a center of the oval.

A constant power line 250 is a set of operation points at which the output power of the engine 2 is the same. Accordingly, when the output power that is requested to the engine 2 (hereinafter also referred to as "engine requested power Pe") is determined, the operation point of the engine 2 can be set on the constant power line that corresponds to the engine requested power Pe.

An optimum fuel economy operation line 215 is indicated by a set of operation points at which the fuel consumption amount of the engine 2 becomes the smallest with respect to the same engine output power. The optimum fuel economy operation line 215 can be determined uniquely in advance on the basis of an experiment result or the like.

Accordingly, for a change of the engine output power, the fuel economy of the engine 2 can be improved by setting the engine operation point on the optimum fuel economy operation line 215. That is, in some embodiments the operation point of the engine 2 is set by following a crossing point between the constant power line 250 that corresponds to the engine requested power Pe and the optimum fuel economy operation line 215 from a perspective of the fuel economy.

Furthermore, the optimum fuel economy operation point P0 at which the engine efficiency becomes the maximum is present on the optimum fuel economy operation line 215. Accordingly, when the engine 2 is actuated in accordance with the optimum fuel economy operation point P0, the fuel economy can be improved at a maximum.

The engine requested power Pe is represented by a sum of power required for traveling of the hybrid vehicle 100 (the travel power Pr*) and the charging/discharging requested power Pchg of the electrical storage device 16. The travel power Pr* can be computed on the basis of a product of travel drive power (the torque) required for traveling of the hybrid vehicle 100 and a rotational speed of the drive shaft 12. For example, the travel drive power (the torque) can be computed on the basis of the operation amount of the accelerator pedal by the driver and the vehicle speed.

The charging/discharging requested power Pchg indicates charging/discharging electric power of the electrical storage device 16 for the SOC control of the electrical storage device 16. It should be noted that, in the following description, the charging/discharging requested power Pchg is set as Pchg>0 when discharging of the electrical storage device 16 is promoted, and the charging/discharging requested power Pchg is set as Pchg<0 when charging of the electrical storage device 16 is promoted. Thus, it is indicated that Pe=Pr*−Pchg.

In the SOC control, the charging/discharging requested power Pchg is set such that the SOC of the electrical storage device 16 approaches the target SOC. That is, when the SOC is lower than the target SOC, Pchg<0 is set. Thus, the engine requested power Pe becomes higher than the travel power Pr*. On the contrary, when the SOC is higher than the target SOC, Pchg>0 is set. Thus, the engine requested power Pe becomes lower than the travel power Pr*.

For example, in the case where the electrical storage device 16 is charged at an operation point P1 on the constant power line 250 that corresponds to the travel power Pr* in FIG. 6, Pchg<0 is set, and thus Pe>Pr*. In this way, the engine operation point moves to a high power side (an upper right direction in the drawing) on the optimum fuel economy operation line 215. Thus, the electrical storage device 16 can be charged by extra engine power (|Pchg|) that is output with respect to the travel power Pr*.

Here, the operation point after movement is closer to the optimum fuel economy operation point P0 than the operation point P1 that corresponds to the travel power Pr*. Thus, by further outputting the charging/discharging requested power Pchg of the electrical storage device 16, the energy efficiency of the engine 2 is increased while the fuel consumption amount thereof is increased. In this case, the ratio of the fuel consumption amount that is used for charging of the electrical storage device 16 to the overall fuel consumption amount is increased. That is, the charging efficiency of the electrical storage device 16 is improved.

During the high-speed traveling, the noise in the circumferential environment is larger than that during the middle or low-speed traveling. Thus, even when the engine operation point that corresponds to the travel power Pr* moves to the high power side, an influence of an increase in engine noise resulted from the movement on the circumferential environment is small. Accordingly, in the case where the engine operation point that corresponds to the travel power Pr* is located on a low power side of the optimum fuel economy operation point P0 during execution of the SOC recovery control, for example, the charging/discharging requested power Pchg (Pchg<0) can be set such that the engine operation point is shifted to the optimum fuel economy operation point P0. In this way, the charging efficiency in the SOC recovery control can be improved.

A second reason is that, because the SOC recovery control is limited to the HV travel in which the hybrid vehicle 100 travels while the engine 2 is constantly actuated in order to forcibly increase the SOC, energy loss that is generated due to the start/stop of the engine 2 is suppressed than that in the CS mode in which the engine 2 is intermittently operated.

For these reasons, in the hybrid vehicle 100, the charging efficiency of the electrical storage device 16 tends to be increased during the high-speed traveling. Accordingly, compared to a case where the hybrid vehicle 100 travels on the freeway and the open road in the CS mode, the travel cost can be reduced in the case where the SOC recovery control is executed during traveling on the freeway so as to increase the SOC value of the electrical storage device 16 and the hybrid vehicle 100 makes the EV travel on the open road by using the electric power stored in the electrical storage device 16. Thus, in order to secure the EV travel while suppressing the actuation of the engine 2 for charging the electrical storage device 16 during traveling on the open road, the target SOC for the SOC recovery control that is executed during traveling on the freeway is set to a high value in some embodiments.

On the other hand, in the case where the target SOC for the SOC recovery control is increased to the full-charge level of the electrical storage device 16, the electric power stored in the electrical storage device 16 cannot be used up by traveling on the open road. Thus, a case where the SOC at a time when the hybrid vehicle 100 reaches the destination point A4 is significantly higher than a lower limit value in the control range RNG is generated. That is, there is a case where the hybrid vehicle 100 reaches the destination point A4 and finishes traveling before the SOC is decreased to the lower limit value in the control range RNG.

In such a case, an electric power amount that can be supplied from the external power supply to the electrical storage device 16 during the external charging at the destination point A4 is decreased in accordance with the electrical storage amount that remains in the electrical storage device 16. As a result, a case where charging cost of the hybrid vehicle 100 becomes higher than charging cost by the external charging in such a degree that the engine 2 is actively actuated by the SOC recovery control may be generated. Thus, there is a possibility that the execution of the SOC recovery control during traveling on the freeway does not necessarily lead to reduction in a total travel cost of the hybrid vehicle 100.

Accordingly, in the first embodiment, the travel cost (a first travel cost) at a time when the EV travel is made by using the electric power that is charged in the electrical storage device 16 during the HV travel on the freeway and the travel cost (a second travel cost) at the time when the EV travel is made by using the electric power that is charged in the electrical storage device 16 by the external charging at the destination point A4 are computed. Then, the two computed travel costs are compared, and based on a comparison result, the target SOC for the SOC recovery control that is executed during traveling on the freeway is set.

A description will hereinafter be made on basic concept of the travel control of the hybrid vehicle 100 according to the first embodiment.

The travel control of the hybrid vehicle 100 according to this first embodiment is mainly configured by including (1) computation of the travel costs, (2) a comparison of the travel costs, (3) setting of the target SOC in the SOC recovery control, and (4) the travel control of the vehicle in conjunction with the SOC recovery control. A description will be made on details of each process.

FIG. 7 is a table for explaining a computation method of the travel cost in each of the travel modes when the hybrid vehicle 100 travels on the freeway and the open road.

With reference to FIG. 7, the travel cost can be computed on the basis of performance of the vehicle with respect to energy consumption, a unit price of the fuel that is reserved in a fuel tank, a charged electric power unit price (an electric power amount price) at a time when the external charging is performed, and the like. Of the above, the performance of the vehicle with respect to the energy consumption includes the fuel economy as the travel distance of the vehicle per unit consumption amount of the fuel and electric power consumption as the travel distance of the vehicle per unit consumption amount of the electric power.

The fuel unit price may be input by the driver to the ECU 26 via input means of the navigation system 28 during refueling or may be obtained from transmission means at a gas station via communication, for example. The charged electric power unit price may be input by the driver to the ECU 26 via the input means of the navigation system 28 during the external charging or may be obtained from an electric power company or the like by connecting to a network such as the Internet.

The travel cost in the CS mode A travel cost A1 at a time when the hybrid vehicle 100 travels on the freeway in the CS mode is computed by dividing the fuel unit price by the fuel economy at a time when the hybrid vehicle 100 steadily travels on the freeway in the CS mode. For example, the travel cost A1 [yen/km] is computed by the following expression (1) when the fuel economy at a time when the hybrid vehicle 100 steadily travels at a legal speed of the freeway (for example, 100 km per hour) in the CS mode is set as F1 [km/L] and the fuel unit price is set as FP1 [yen/L].

$$A1 = FP1/F1 \quad (1)$$

It should be noted that the fuel economy F1 [km/L] used for computation of the travel cost A1 can be computed on the basis of past travel history that is stored in the navigation system 28, for example.

Meanwhile, a travel cost A2 at a time when the hybrid vehicle 100 travels on the open road in the CS mode is computed by dividing the fuel unit price FP1 [yen/L] by the fuel economy at the time when the hybrid vehicle 100 travels on the open road in the CS mode. For example, the travel cost A2 [yen/km] is computed by the following expression (2) when the fuel economy at the time when the hybrid vehicle 100 travels on the open road in the CS mode is set to F2 [km/L].

$$A2 = FP1/F2 \quad (2)$$

It should be noted that, similar to the above fuel economy F1 [km/L], the fuel economy F2 [km/L] used for computation of the travel cost A2 can be computed on the basis of the past travel history that is stored in the navigation system 28. Alternatively, fuel economy that is measured by a standardized fuel economy measuring method (for example, a JC08 mode) that appears in a vehicle catalog or the like can be used.

The travel cost during the EV travel by using the electric power charged on the freeway Making the EV travel on the freeway by using the electric power stored in the electrical storage device 16 during traveling on the freeway is equivalent to traveling on the freeway in the CS mode. Accordingly, a travel cost B1 at the time when the EV travel is made by using the electric power that is charged on the freeway is equal to the travel cost A1 at the time when the hybrid vehicle 100 travels on the freeway in the CS mode that has already been described (A1=B1).

Meanwhile, a travel cost B2 at a time when the EV travel is made on the open road by using the electric power that is charged on the freeway is computed by dividing cost of the fuel that is consumed for charging of the electrical storage device 16 during traveling on the freeway by a travel permissible distance in the EV travel by using the electric power stored in the electrical storage device 16 during traveling on the freeway.

For example, in the case where the fuel economy at a time when the hybrid vehicle 100 makes the HV travel at 100 km per hour is set as F3 [km/L], a difference (=F1−F3) between the fuel economy F1 [km/L] and the fuel economy F3 [km/L] at a time when the hybrid vehicle 100 steadily travels at 100 km per hour in the CS mode corresponds to a distance for which the hybrid vehicle 100 makes the EV travel in the CS mode. Then, by dividing this distance (F1−F3) [km] by the fuel economy F3 [km/L], the fuel consumption amount that is used for charging of the electrical storage device 16 in the HV travel is computed. The cost of the fuel that is consumed for charging of the electrical storage device 16 during traveling on the freeway is computed by multiplying this fuel consumption amount by a fuel unit price FP1 [yen/L].

In the case where the electrical storage amount stored in the electrical storage device 16 during the HV travel at 100 km per hour is set as W [Ah] and the electric power consumption at a time when the hybrid vehicle 100 makes the EV travel on the open road is set as E1 [km/Ah], the travel permissible distance in the EV travel by using the electric power stored in the electrical storage device 16 during traveling on the freeway is expressed by W×E1 [km].

From what has been described so far, the travel cost B2 [yen/km] is computed by the following expression (3).

$$B2 = (F1/F3 - 1) \times FP1/(W \times E1) \quad (3)$$

The electric power consumption E1 [km/Ah] used for computation of the travel cost B2 can be computed on the basis of the past travel history that is stored in the navigation system 28. Alternatively, the electric power consumption that is measured by the standardized fuel economy measuring method (for example, the JC08 mode) that appears in the vehicle catalog or the like can be used.

A travel cost C1 at a time when the hybrid vehicle 100 makes the EV travel on the freeway by using charged electric power at a charging stand is computed by dividing the charging cost at a time when a specified electric power amount is charged at the charging stand by the travel permissible distance in the EV travel by using said specified electric power amount. More specifically, the travel cost C1 is computed by dividing the charged electric power unit price at the charging stand by the electric power consumption at the time when the hybrid vehicle 100 makes the EV travel on the freeway. For example, in the case where the electric power consumption at a time when the hybrid vehicle 100 makes the EV travel at 100 km per hour is set as E2 [km/Ah] and the charged electric power unit price at the charging stand is set as EP1 [yen/Ah], the travel cost C1 [yen/km] is computed by the following expression (4).

$$C1 = EP1/E2 \quad (4)$$

It should be noted that the electric power consumption E2 [km/Ah] used for computation of the travel cost C1 can be computed on the basis of the past travel history that is stored in the navigation system 28, for example.

Meanwhile, a travel cost C2 at a time when the hybrid vehicle 100 makes the EV travel on the open road by using the charged electric power at the charging stand is computed by dividing the charged electric power unit price EP1 [yen/Ah] by the electric power consumption at the time when the hybrid vehicle 100 travels on the open road. By using the electric power consumption E1 [km/Ah] at the time when the hybrid vehicle 100 travels on the open road, the travel cost C2 [yen/km] is computed by the following expression (5).

$$C2 = EP1/E1 \quad (5)$$

A travel cost D1 at a time when the hybrid vehicle 100 makes the EV travel on the freeway by using the charged electric power by a domestic power supply is computed by dividing the charging cost at a time when the specified electric power amount is charged by the domestic power supply by the travel permissible distance in the EV travel by using said specified electric power amount. More specifically, the travel cost D1 is computed by dividing the charged electric power unit price by the domestic power supply by the electric power consumption at the time when the hybrid vehicle 100 makes the EV travel on the freeway. For example, in the case where the electric power consumption at the time when the hybrid vehicle 100 makes the EV travel at 100 km per hour is set as E2 [km/Ah] and the charged electric power unit price by the domestic power supply is set as EP2 [yen/Wh], the travel cost D1 [yen/km] is computed by the following expression (6).

$$D1 = EP2/E2 \quad (6)$$

Meanwhile, a travel cost D2 at a time when the hybrid vehicle 100 makes the EV travel on the open road by using the charged electric power by the domestic power supply is computed by dividing the charged electric power unit price EP2 [yen/Ah] by the electric power consumption E1 [km/Ah] at the time when the hybrid vehicle 100 travels on the open road. That is, the travel cost D2 [yen/km] is computed by the following expression (7).

$$D2 = EP1/E1 \quad (7)$$

It should be noted that an electric power amount price in a scheduled time range in which the external charging is executed may be used as the charged electric power unit price EP2 [yen/Ah] by the domestic power supply.

In the comparison of the travel costs in the travel modes shown in FIG. 7, the travel cost B2 at the time when the EV travel is made on the open road by using the electric power that is charged on the freeway becomes lower than the travel cost A2 at a time when the hybrid vehicle 100 travels on the open road in the CS mode because the charging efficiency of the electrical storage device 16 during traveling at the high speed is high (B2<A2). Thus, in order to secure the EV travel by suppressing the actuation of the engine 2 for charging the electrical storage device 16 during traveling on the open road, the target SOC for the SOC recovery control that is executed during traveling on the freeway is set to a high value in some embodiments.

When the target SOC for the SOC recovery control is set, the travel cost (the first travel cost) at the time when the EV travel is made by using the electric power that is charged on the freeway and the travel cost (the second travel cost) at the time when the EV travel is made by using the electric power that is externally charged at the destination point A4 are compared.

The travel cost at the time when the EV travel is made by using the electric power that is charged on the freeway corresponds to the travel costs B1, B2 that have already been described. Meanwhile, the travel cost at the time when the EV travel is made by using the electric power that is externally charged at the destination point A4 has a different value in accordance with a type of the external power supply installed at the destination point A4 (the charged electric power unit price of the external power supply).

Accordingly, in the case where the external power supply installed at the destination point A4 is the charging stand, the travel costs B1, B2 and the travel costs C1, C2 at the time when the EV travel is made by using the charged electric power at the charging stand that has already been described are compared. Meanwhile, in the case where the external power supply installed at the destination point A4 is the domestic power supply, the travel costs B1, B2 and the travel costs D1, D2 at the time when the EV travel is made by using the charged electric power by the domestic power supply that has already been described are compared.

In the above-described comparison of the travel costs, in the case where the travel costs B1, B2 at the time when the EV travel is made by using the electric power that is charged on the freeway are higher than the travel costs (C1, C2 or D1, D2) at the time when the EV travel is made by using the electric power that is externally charged at the destination point A4, some embodiments use up the electric power stored in the electrical storage device 16 by traveling in the section from the point A3 to the point A4 (the open road).

Figure 8:
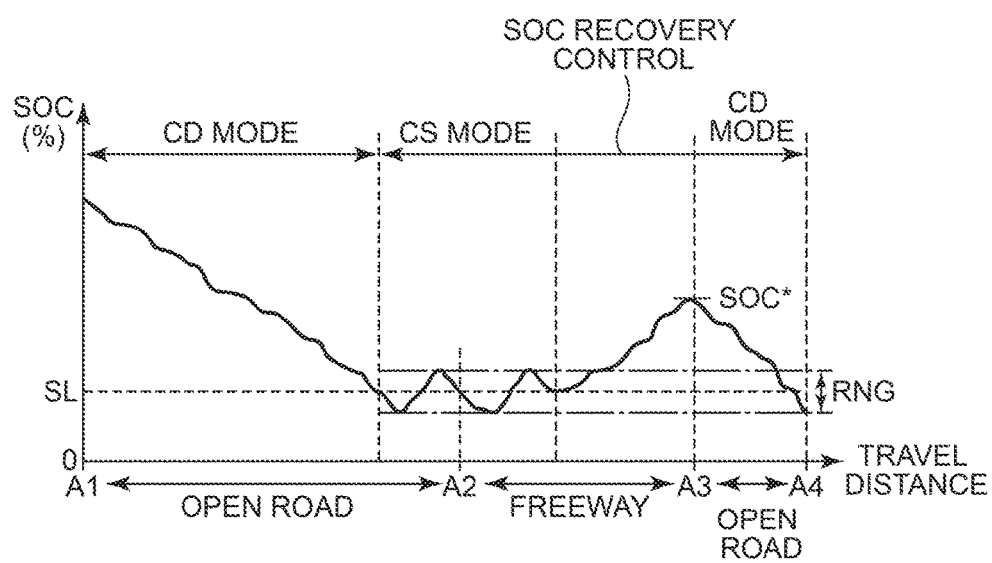
FIG. 8 is a schematic waveform chart for showing a first example of the transitions of the modes and the SOC when the hybrid vehicle travels on a route like that shown in FIG. 3.

That is, as shown in FIG. 8, in some embodiments the SOC at the time when the hybrid vehicle 100 reaches the destination point A4 approaches the lower limit value in the control range RNG as close as possible. In this way, as large electric power amount as possible can be stored in the electrical storage device 16 by the external charging at the destination point A4.

FIG. 8 shows a first example of the transitions of the modes and the SOC when the hybrid vehicle 100 travels on a route like that shown in FIG. 3.

The transition of the modes of the hybrid vehicle 100 that are shown in FIG. 8 is the same as the transition of the modes that are shown in FIG. 5. That is, the SOC recovery control is executed such that the SOC reaches the target SOC (the SOC*) when the hybrid vehicle 100 passes the point A3 as the exit of the freeway during the travel on the freeway.

In the SOC recovery control at this time, the target SOC is set such that the electric power amount required for the hybrid vehicle 100 to make the EV travel in the section from the point A3 to the destination point A4 (the open road) is stored in the electrical storage device 16. In this way, in order for the hybrid vehicle 100 to travel in the CD mode in the section from the point A3 to the destination point A4 (the open road), the SOC is decreased in conjunction with the increase in the travel distance and reaches the lower limit value in the control range RNG at the destination point A4.

Then, at the destination point A4, the SOC of the electrical storage device 16 is recovered from the lower limit value in the control range RNG to the full charge state by the external charging. Accordingly, because the EV travel by using the electric power that is charged by the external charging can be made in the next travel, the total travel cost of the hybrid vehicle 100 can be reduced.

Figure 9:
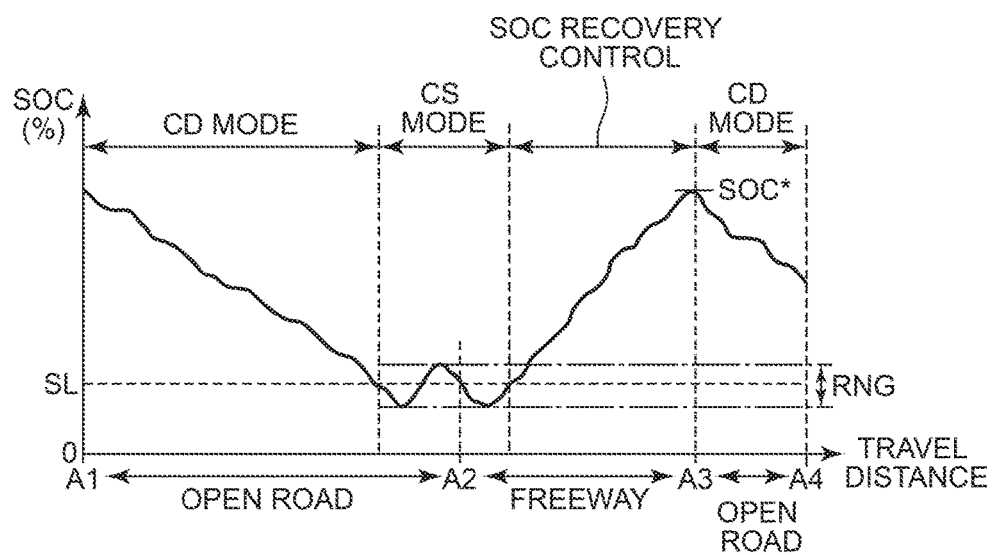
FIG. 9 is a schematic waveform chart for showing a second example of the transitions of the modes and the SOC when the hybrid vehicle travels on the route like that shown in FIG. 3.

On the other hand, in the case where the travel costs (C1, C2 or D1, D2) at the time when the EV travel is made by using the electric power that is externally charged at the destination point A4 are higher than the travel costs B1, B2 at the time when the EV travel is made by using the electric power that is charged on the freeway, as shown in FIG. 9, in some embodiments a larger electric power amount than the electric power amount required for the travel in the section from the point A3 to the point A4 (the open road) is stored in the electrical storage device 16.

FIG. 9 shows a second example of the transitions of the modes and the SOC when the hybrid vehicle 100 travels on the route like that shown in FIG. 3.

In the transition of the modes of the hybrid vehicle 100 that is shown in FIG. 9, similar to the transition of the modes that is shown in FIG. 8, the SOC recovery control is executed such that the SOC reaches the target SOC (the SOC*) when the hybrid vehicle 100 passes the point A3 as the exit of the freeway during the travel on the freeway.

In the SOC recovery control at this time, the target SOC is set such that the SOC is brought into the full-charged level when the hybrid vehicle 100 passes the point A3. In this way, there is a case where, when the hybrid vehicle 100 travels in the CD mode in the section from the point A3 to the destination point A4 (the open road) and reaches the destination point A4, the electric power stored in the electrical storage device 16 cannot be used up and the SOC of the electrical storage device 16 is higher than the lower limit value in the control range RNG.

Then, at the destination point A4, the SOC of the electrical storage device 16 is recovered from a higher value than the lower limit value in the control range RNG to the full charge state by the external charging. Accordingly, the EV travel by using the electric power that is generated by the actuation of the engine 2 and the electric power that is charged by the external power supply is made in the next travel. According to the modes that are shown in FIG. 9, compared to the modes that are shown in FIG. 8, the charging cost by the external charging can be suppressed. Thus, the total travel cost of the hybrid vehicle 100 can be reduced.

Figure 10:
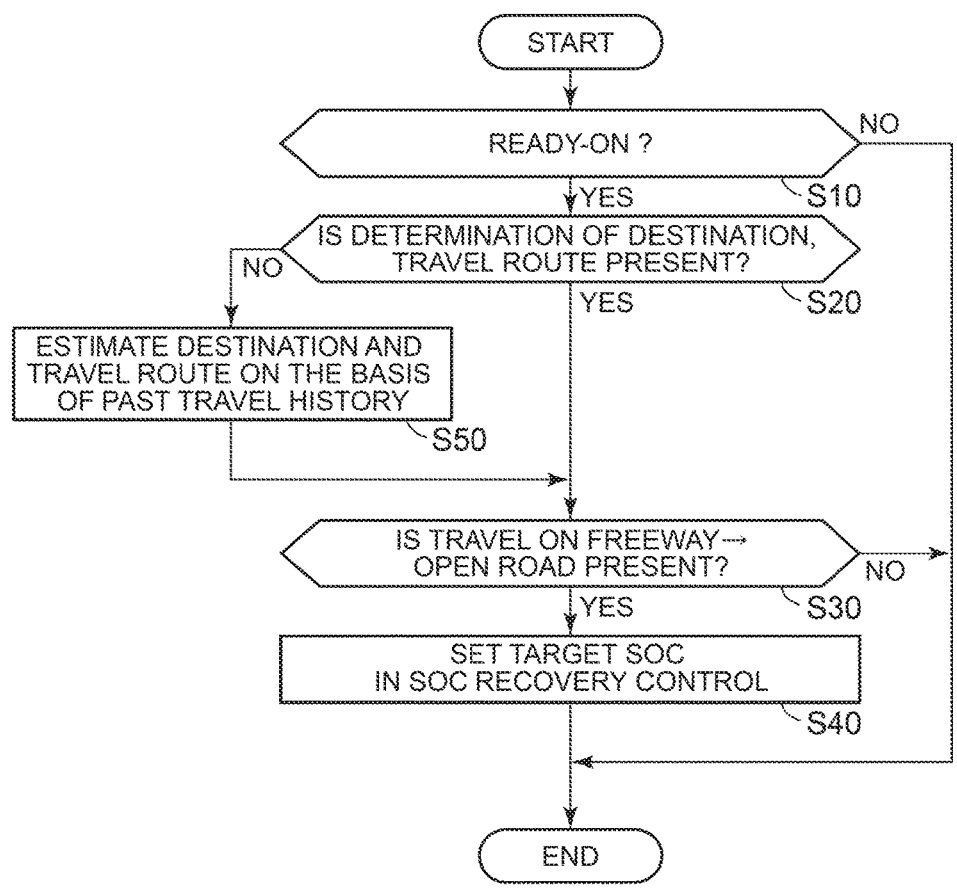
FIG. 10 is a flowchart for explaining a control process that is related to SOC recovery control in the hybrid vehicle according to the first embodiment.

FIG. 10 is a flowchart for explaining a control process that is related to the SOC recovery control in the hybrid vehicle according to the first embodiment. The control process shown in the flowchart in FIG. 10 is called from a main routine and executed at each specified time or when a specified condition is established.

With reference to FIG. 10, the ECU 26 determines in step S10 whether the hybrid vehicle 100 is in a "READY-ON" state. It should be noted that whether the vehicle is in the READY-ON state is determined as a condition that is related to a travel start of the vehicle in order to determine whether a system is activated with an intention of the travel. Instead of the "READY-ON", for example, detection of opening of a driver's side door or seating on a driver seat may be determined as a condition that is related to travel monitoring of the vehicle.

If it is determined that the vehicle is in the READY-ON state (if determined YES in S10), the ECU 26 determines in step S20 whether the travel route to the destination is determined from the destination and the current spot. The ECU 26 obtains information on presence or absence of a determination of the destination and the travel route by communicating with the navigation system 28. For example, the ECU 26 obtains information (hereinafter referred to as "route information") on the destination and the travel route to the destination from the current spot from the navigation system 28 when the hybrid vehicle 100 is brought into the READY-ON state. It should be noted that the route information includes a height difference at every specified distance in the travel route, a standard travel speed, the unit price of the fuel that is reserved in the fuel tank, and a type of the external power supply that is installed at the destination (the charged electric power unit price of the external power supply), and the like.

If the destination and the travel route are not determined in step S20 (if determined NO in S20), the process proceeds to step S50. Then, the ECU 26 obtains information on the past travel history from the navigation system 28 and estimates the destination and the travel route from the current spot to the destination from the obtained travel history.

Next, the ECU 26 determines in step S30 whether the obtained or estimated travel route includes the freeway and the open road from the exit of the freeway to the destination. If the travel route includes the freeway and the open road in this order (if determined YES in S30), the process proceeds to step S40, and the ECU 26 sets the target SOC in the SOC recovery control that is executed during the travel on the freeway.

If the travel route does not include the freeway and the open road in this order (if determined NO in S30), the process in step S40 is skipped. In this case, the SOC recovery control is not executed, and the hybrid vehicle 100 travels by selecting either the CD mode or the CS mode (see FIG. 12). In the CS mode, the ECU 26 executes the SOC control so as to maintain the SOC within the control range RNG.

Figure 11:
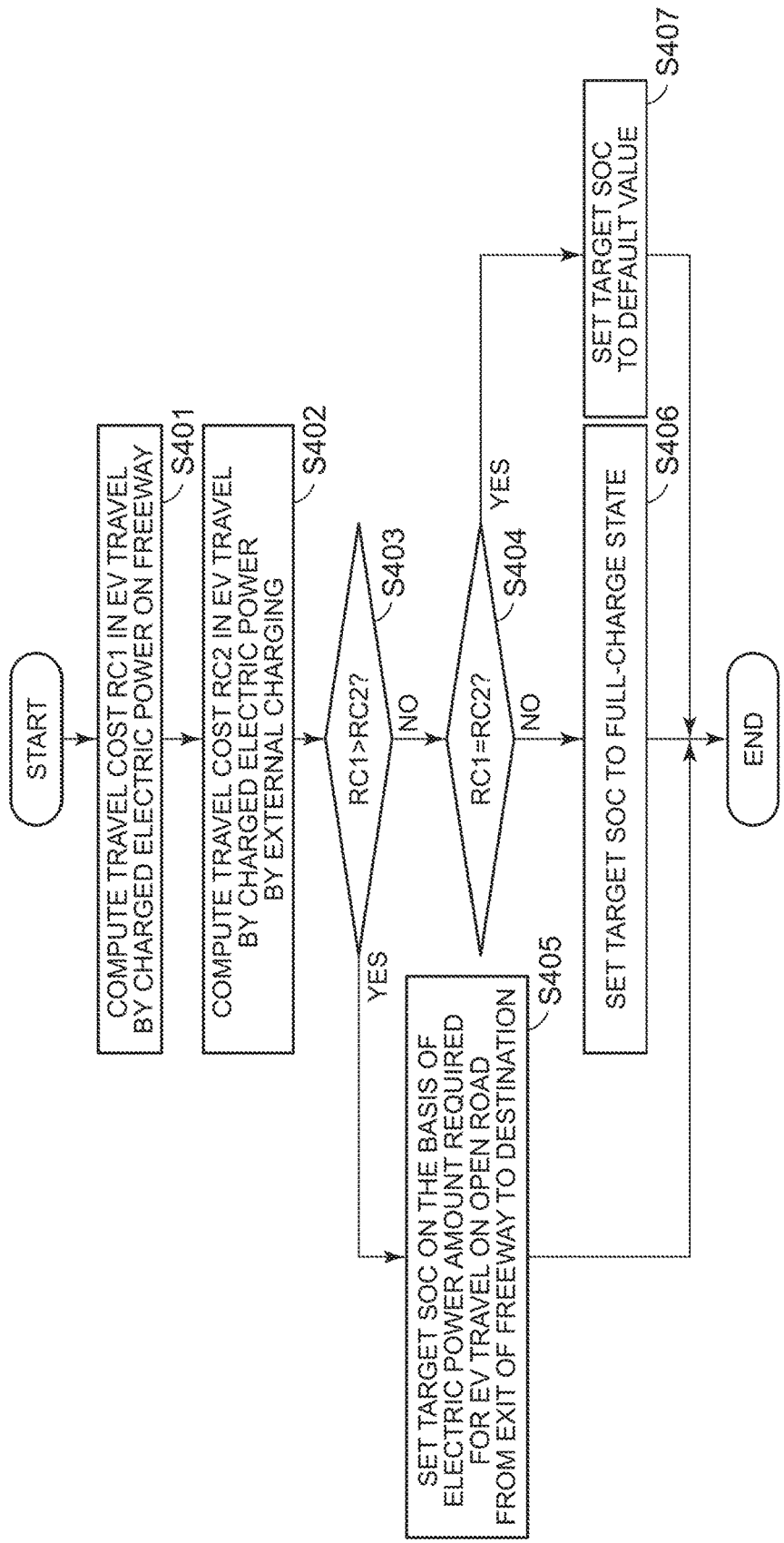
FIG. 11 is a flowchart for explaining a process for setting a target SOC in the SOC recovery control that is executed in step S40 in FIG. 10.

FIG. 11 is a flowchart for explaining a process for setting the target SOC in the SOC recovery control that is executed in step S40 in FIG. 10.

With reference to FIG. 11, in step S401, the ECU 26 first computes a travel cost RC1 (the first travel cost) at the time when the EV travel is made by using the electric power that is charged on the freeway. The travel cost RC1 corresponds to the travel costs B1, B2 that have already been described. The ECU 26 stores characteristic information of the hybrid vehicle 100 in the memory. This vehicle characteristic information includes performance related to the energy consumption of the hybrid vehicle 100 (the fuel economy and the electric power consumption), travel resistance, a vehicle weight, and the like. The ECU 26 computes the travel cost RC1 by using the route information and the vehicle characteristic information.

Next, in step S402, the ECU 26 computes a travel cost RC2 (the second travel cost) at a time when the EV travel is made by using the charged electric power by the external power supply. The travel cost RC2 corresponds to the travel costs C1, C2 at the time when the EV travel is made by using the charged electric power at the charging stand that have already been described or the travel costs D1, D2 at the time when the EV travel is made by using the charged electric power by the domestic power supply that have already been described. The ECU 26 refers to the route information, detects the type of the external power supply installed at the destination, and computes the travel cost RC2 in accordance with the type of the detected external power supply.

Once the travel costs RC1, RC2 are respectively computed in steps S401, S402, the ECU 26 compares these two travel costs RC1, RC2. Then, based on a comparison result, the ECU 26 sets the target SOC in the SOC recovery control that is executed during the travel on the freeway.

More specifically, if the travel cost RC1 is higher than the travel cost RC2 (if determined YES in S403), the process proceeds to step S405, and the ECU 26 sets the target SOC such that the electric power amount required for the hybrid vehicle 100 to make the EV travel in the section from the exit of the freeway to the destination (the open road) is stored in the electrical storage device 16. For example, the ECU 26 divides the travel distance in the section from the exit of the freeway to the destination by the electric power consumption E1 [km/Ah] at the time when the hybrid vehicle 100 travels on the open road, and thereby computes the electric power amount that is required to travel said section.

It should be noted that, when the electric power amount that is required to travel the section from the exit of the freeway to the destination is computed, a value that is obtained by integrating the height difference for each specified distance of said section that is obtained from the route information and the vehicle weight may be added to a value that is obtained by dividing the travel distance of the section from the exit of the freeway to the destination by the electric power consumption E1. In this way, computation accuracy of the electric power amount can be increased.

On the other hand, if the travel cost RC1 is lower than the travel cost RC2 (if determined NO in S403 and S404), the process proceeds to step S406, and the ECU 26 sets the target SOC to the specified full-charge level of the electrical storage device 16.

If the travel cost RC1 is equal to the travel cost RC2 (if determined YES in S404), the process proceeds to step S407, and the ECU 26 sets the target SOC in the SOC recovery control to a default value. For example, while the target SOC of the SOC control in the CS mode (for example, corresponding to the specified value SL) is approximately 50 to 60%, the default value is set to approximately 70%.

Figure 12:
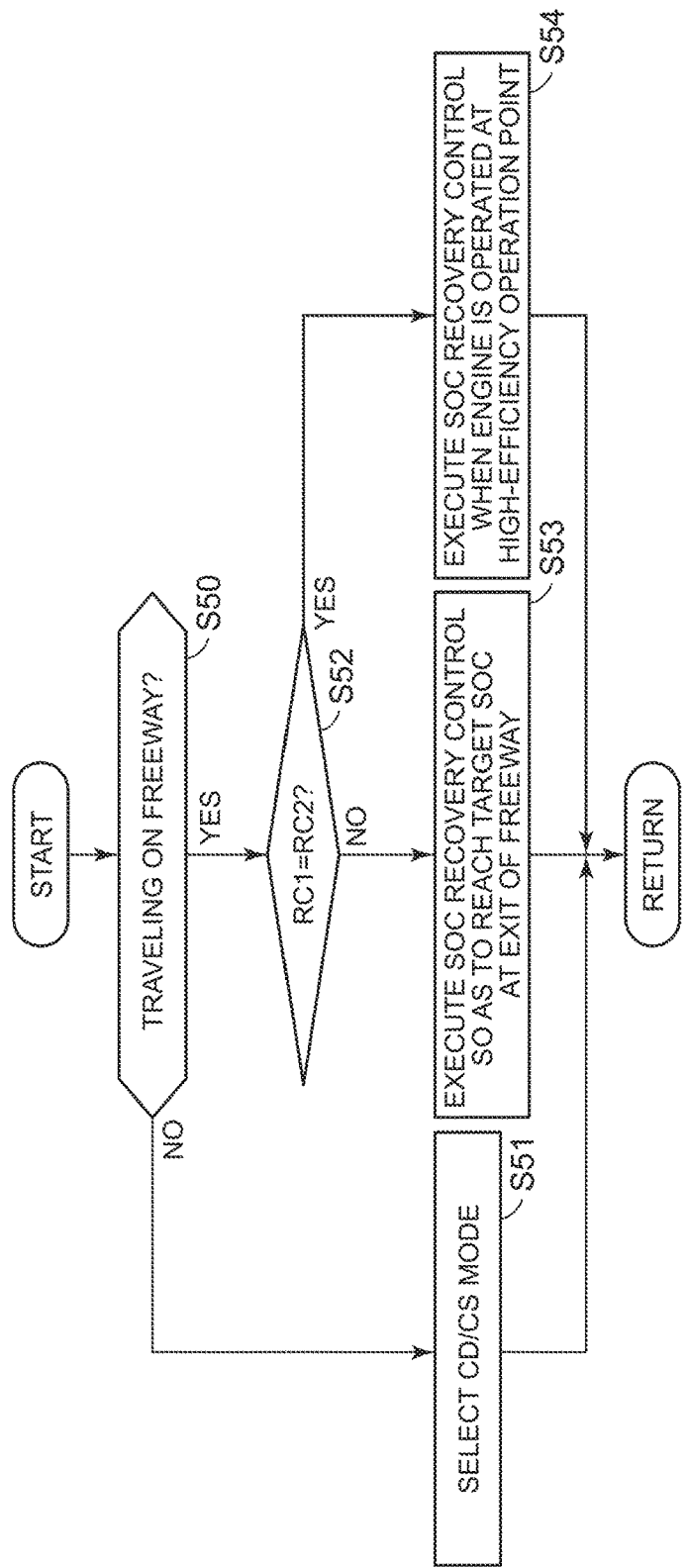
FIG. 12 is a flowchart for explaining travel control in the hybrid vehicle according to the first embodiment.

FIG. 12 is a flowchart for explaining the travel control in the hybrid vehicle according to the first embodiment. FIG. 12 shows a process related to the SOC control among the travel control. The control process shown in FIG. 12 is executed at specified intervals by the ECU 26.

With reference to FIG. 12, the ECU 26 determines in step S50 whether the hybrid vehicle 100 is traveling on the freeway. For example, in step S50, the ECU 26 determines whether the hybrid vehicle 100 is traveling on the freeway on the basis of the host vehicle position information that is transmitted from the navigation system 28.

If it is determined that the hybrid vehicle 100 is not traveling on the freeway (if determined NO in S50), the ECU 26 selects the CD mode or the CS mode in step S51. For example, in step S51, the CD mode or the CS mode is selected on the basis of the SOC or in accordance with the operation of a selection switch by the driver. In general, one of the CD mode and the CS mode is selected on the basis of the SOC at the start of the operation of the hybrid vehicle 100. When the CD mode is selected at the start of the operation, as shown in FIG. 2, the mode is switched from the CD mode to the CS mode in accordance with the reduction of the SOC that falls below the specified value SL.

On the other hand, if it is determined that the hybrid vehicle 100 is traveling on the freeway (if determined YES in S50), the ECU 26 executes the SOC recovery control in accordance with the target SOC that is set by the control process shown in step S40 in FIG. 10 and FIG. 11.

More specifically, if it is determined in the control process in FIG. 11 that the travel cost RC1 is not equal to the travel cost RC2 (if determined NO in S52), in step S53, the ECU 26 executes the SOC recovery control in accordance with the target SOC that is set in accordance with magnitudes of the travel cost RC1 and the travel cost RC2. In step S52, as shown in FIG. 8 and FIG. 9, the SOC recovery control is executed such that the SOC reaches the target SOC when the hybrid vehicle 100 passes the exit of the freeway.

In the SOC recovery control, similar to the SOC control in the CS mode, the charging/discharging requested power Pchg is set as Pchg<0 until the SOC reaches the target SOC. Furthermore, in order to increase a charging rate (a charging amount per unit time) of the electrical storage device 16 to be higher than that in the CS mode, the charging/discharging requested power Pchg may be set (Pchg<0) such that an absolute value of the charging/discharging requested power (|Pchg|) with respect to a deviation of the same SOC (a shortage amount of the SOC with respect to the target SOC) becomes large. For example, in the case where the engine operation point that corresponds to the travel power Pr* is located on the low power side of the optimum fuel economy operation point P0 during the execution of the SOC recovery control, the charging/discharging requested power Pchg (Pchg<0) can be set such that the engine operation point is constantly shifted to the optimum fuel economy operation point P0 by an increase of the above |Pchg|. In this way, the charging efficiency in the SOC recovery control is possibly improved from that in the CS mode. It should be noted that in the case where the charging/discharging electric power of the electrical storage device 16 is limited, such as during a low temperature or a high temperature of the electrical storage device 16, there is also a possibility that charging/discharging with the lower electric power than the charging/discharging requested power Pchg in the SOC control is only permitted.

On the other hand, if it is determined in the control process in FIG. 11 that the travel cost RC1 is equal to the travel cost RC2 (if determined YES in S52), in step S54, the ECU 26 executes the SOC recovery control when the engine 2 is operated at a high-efficiency operation point during traveling on the freeway. This is because the charging efficiency of the electrical storage device 16 is changed in accordance with the engine operation point that corresponds to the travel power Pr* during charging of the electrical storage device 16 in the HV travel.

Figure 13:
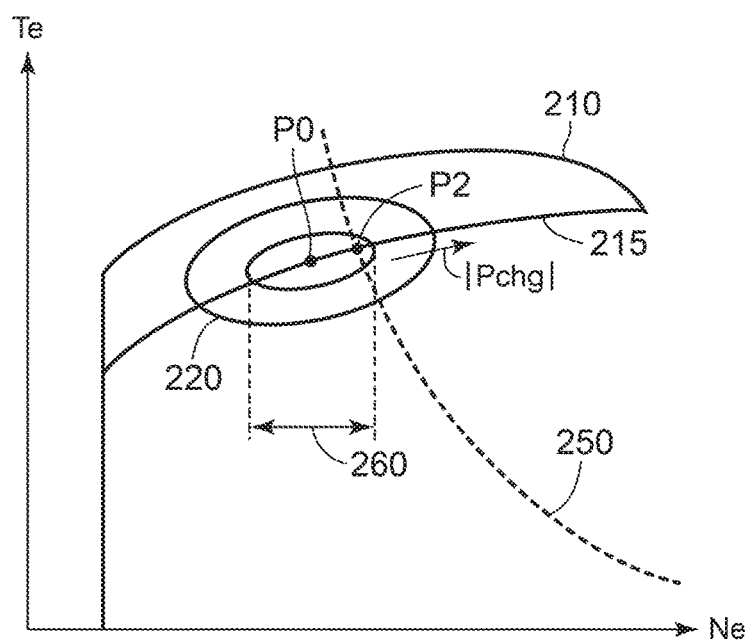
FIG. 13 is a conceptual chart for explaining a relationship between an engine operation point and efficiency.

For example, in the case where the engine operation point that corresponds to the travel power Pr* is P2 in FIG. 13, the charging/discharging requested power Pchg is added to the travel power Pr* so as to increase the engine requested power Pe to be higher than the travel power Pr*. At this time, the engine operation point moves in a direction away from the optimum fuel economy operation point P0. In this case, because the energy efficiency of the engine 2 is lowered, the charging efficiency of the electrical storage device 16 is also lowered. Accordingly, some embodiments prevent deterioration of the fuel economy by preventing the execution of the SOC recovery control. Thus, the ECU 26 executes the SOC recovery control in the case where the engine operation point that is obtained by adding the charging/discharging requested power Pchg to the travel power Pr* is within an operation range (corresponding to a region 260 in the drawing) in which the energy efficiency of the engine 2 is at least equal to a specified reference value. In this way, the SOC recovery control is executed when the engine 2 is operated at the engine operation point at which the charging efficiency of the electrical storage device 16 is increased. Thus, the travel cost at the time when the EV travel is made by using the electric power that is charged on the freeway can be reduced. As a result, the total travel cost of the hybrid vehicle 100 can be reduced.

Just as described, according to the hybrid vehicle according to the first embodiment, in the case where the travel route to the destination includes the freeway and the open road from the exit of the freeway to the destination, the SOC recovery control is executed to increase the SOC value of the electrical storage device during traveling on the freeway such that the SOC of the electrical storage device reaches the target SOC when the hybrid vehicle passes the exit of the freeway, and the EV travel is made on the open road by using the electric power stored in the electrical storage device. In this way, the travel cost can be reduced when compared to the travel cost during traveling on the freeway and the open road in the CS mode.

Furthermore, the target SOC in the SOC recovery control that is executed during traveling on the freeway is set on the basis of a comparison result between the travel cost at a time when the EV travel is made by using the electric power charged in the electrical storage device in the HV travel on the freeway (the first travel cost) and the travel cost at a time when the EV travel is made by using the electric power charged in the electrical storage device by the external charging at the destination (the second travel cost). In this way, the charging cost of the hybrid vehicle can be reduced. Therefore, the total travel cost of the hybrid vehicle can be reduced.

In the above first embodiment, the SOC recovery control of the hybrid vehicle that is configured by coupling the engine 2 and the two motor generators 6, 10 by the power split device 4 shown in FIG. 1 has been described. However, the hybrid vehicle to which the disclosed subject matter is applied is not limited to such a configuration.

That is, the disclosed subject matter can be applied commonly to a hybrid vehicle that has a vehicle configuration capable of increasing the electrical storage amount (the SOC) of the electrical storage device by engine output. In the second embodiment, as shown in FIG. 14, the disclosed subject matter is applied to a hybrid vehicle 100A that is configured by mechanically coupling the engine 2 and the drive wheels 14 via a clutch 30.

Figure 14:
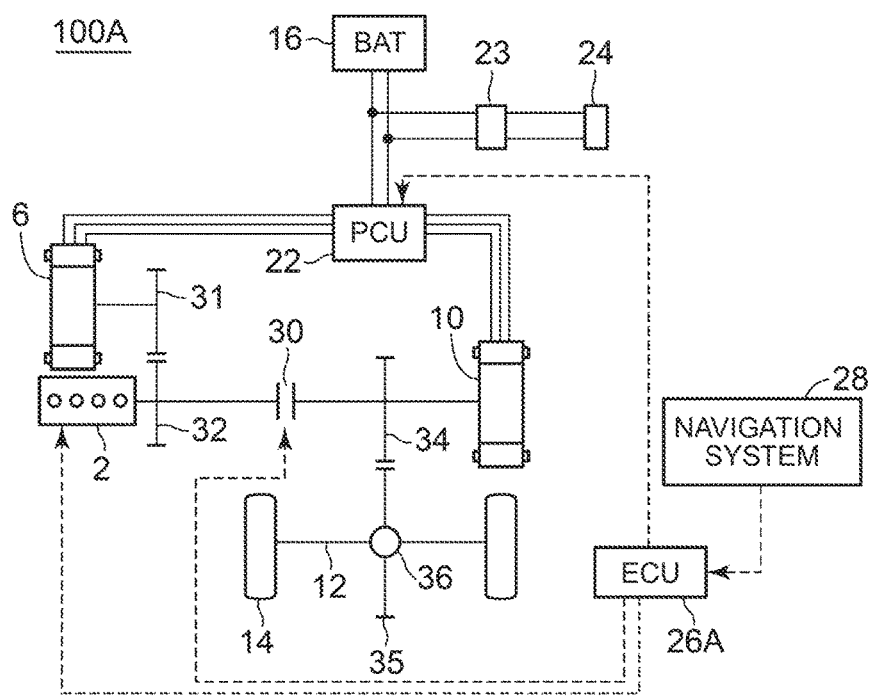
FIG. 14 is a block diagram for showing an overall configuration of a hybrid vehicle according to a second embodiment.

FIG. 14 is a block diagram that shows an overall configuration of the hybrid vehicle according to the second embodiment.

With reference to FIG. 14, the hybrid vehicle 100A includes the engine 2, the motor generators 6, 10, the clutch 30, the drive wheels 14, gears 31, 32, an output gear 34, a differential gear device 36, the drive shaft 12, an electric power converter unit (PCU) 22, the electrical storage device 16, and an ECU 26A. In addition, the hybrid vehicle 100A further includes the electric power converter 23 and the connection section 24 as a configuration to externally charge the electrical storage device 16.

An output shaft (a crankshaft) of the engine 2 and an output shaft of the motor generator 6 are coupled through the gears 31 and 32. An output shaft of the motor generator 10 is coupled to the output gear 34. The output gear 34 is coupled to a gear 35 that is provided in the differential gear device 36. The drive wheels 14 are coupled to the differential gear device 36 through the right and left drive shafts 12. Just as described, the motor generator 6 is mechanically coupled to the engine 2, and the motor generator 10 is mechanically coupled to the drive wheels 14.

The clutch 30 is provided between the output shaft (the crankshaft) of the engine 2 and the output gear 34. The clutch 30 is constructed of a hydraulic friction engagement device, for example. The clutch 30 is controlled in a "coupling state" for mechanically coupling the engine 2 and the output gear 34 or a "blocking state" for mechanically decoupling these in accordance with a control signal from the ECU 26A.

That is, when the clutch 30 is controlled in the coupling state, a mechanical power transmission path is established between the engine 2 and the drive wheels 14. On the other hand, when the clutch 30 is controlled in the blocking state, the mechanical power transmission path between the engine 2 and the drive wheels 14 is blocked. As will be described in detail below, travel modes of the hybrid vehicle 100A are switched by control of the clutch 30. The clutch 30 corresponds to one example of the "switching unit". The "coupling state" and the "blocking state" can be regarded as an engaged state and a disengaged state of the clutch 30.

In an configuration example of FIG. 14, output of the engine 2 is transmitted to the drive wheel 14 not via a transmission but through the output gear 34. However, a gear that constitutes a reduction gear can be arranged between an output shaft of the motor generator 10 and the output gear 34. Alternatively, the output shaft of the engine 2 and the motor generator 6 may be coupled to each other without the gear being interposed therebetween.

The electrical storage device 16 is electrically connected to the PCU 22 for driving the motor generators 6, 10. The PCU 22 converts DC power that is supplied from the electrical storage device 16 into AC power and drives the motor generators 6, 10. Alternatively, the PCU 22 converts the AC power that is generated by the motor generators 6, 10 into the DC power and charges the electrical storage device 16.

Similar to the hybrid vehicle 100 according to the first embodiment, the hybrid vehicle 100A according to the second embodiment executes the travel control for controlling the vehicle travel by selectively applying the CD mode and the CS mode.

When the CS mode is selected, the hybrid vehicle 100A travels in conjunction with switching of the plural travel modes by the ECU 26A. More specifically, the travel modes include the "EV travel" in which the hybrid vehicle 100A travels while the engine 2 is stopped and the "HV travel" in which the hybrid vehicle 100A travels while the engine 2 is actuated. The HV travel is further categorized into "series HV travel" in which the output of the engine 2 is only used for electric power generation and "parallel HV travel" in which at least some of the output of the engine 2 is directly used for the vehicle travel. That is, the hybrid vehicle 100A travels by switching among the EV travel, the series HV travel, and the parallel HV travel in accordance with a travel situation.

Figure 15:
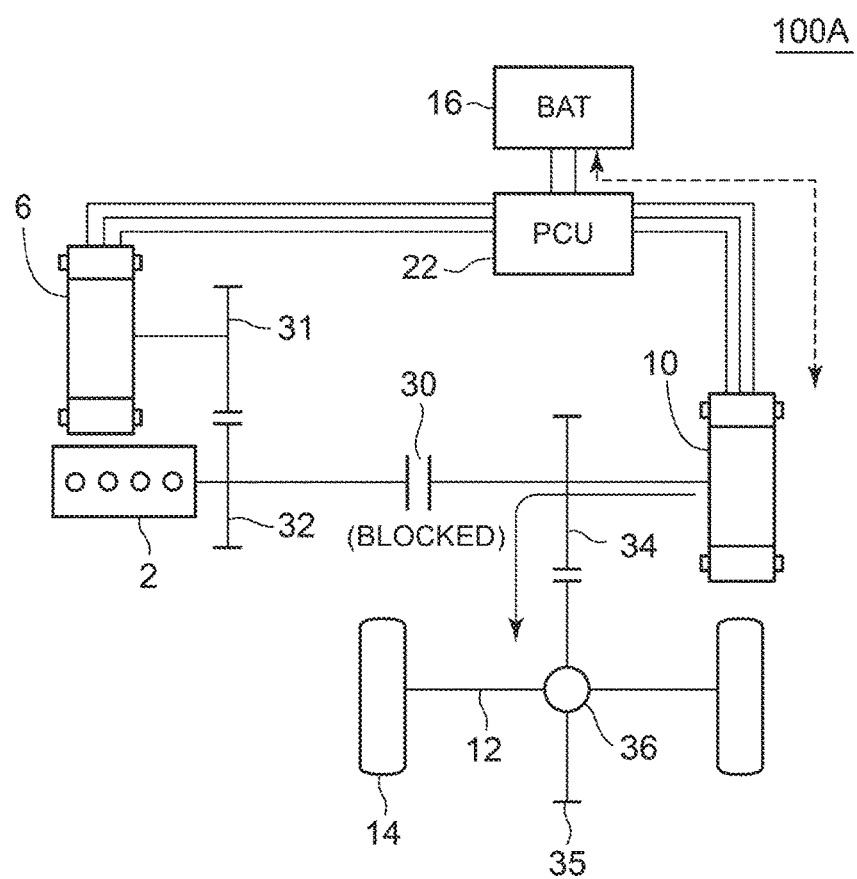
FIG. 15 is a block diagram for explaining a power transmission path in an EV travel.

Next, a power transmission path in each of the travel modes will be described by using FIG. 15 to FIG. 17. FIG. 15 is a block diagram for explaining a power transmission path in the EV travel.

With reference to FIG. 15, the clutch 30 is controlled in the blocking state in the EV travel. Because the engine 2 is stopped in the EV travel, the hybrid vehicle 100A travels by using output of the motor generator 10 that uses the electric power stored in the electrical storage device 16. Also during the EV travel, the electric power of the motor generator 10 generated by a regenerative brake can be collected by the electrical storage device 16.

Figure 16:
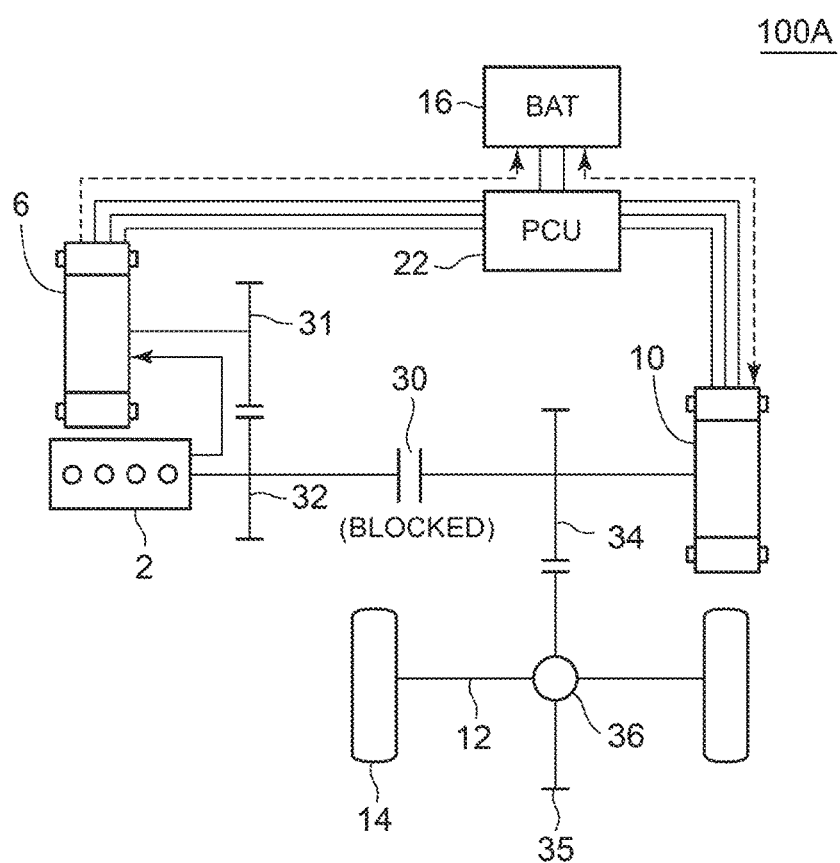
FIG. 16 is a block diagram for explaining a power transmission path in a series HV travel.

FIG. 16 is a block diagram for explaining a power transmission path in the series HV travel.

With reference to FIG. 16, in the series HV travel, the engine 2 is actuated, and the clutch 30 is controlled in the blocking state. Thus, the output of the engine 2 is not transmitted to the drive wheels 14 but transmitted to the motor generator 6. The motor generator 6 generates the electric power by using the output of the engine 2. The hybrid vehicle 100A uses the generated electric power by the motor generator 6 and/or the stored electric power in the electrical storage device 16 and travels by the output of the motor generator 10.

That is, in the series HV travel, when the generated electric power by the motor generator 6 is excessive with respect to the power required for the vehicle travel (the travel power), said excessive electric power is stored in the electrical storage device 16. On the other hand, when the generated electric power by the motor generator 6 is short with respect to the travel power, the motor generator 10 is operated by adding discharged electric power from the electrical storage device 16 to the generated electric power by the motor generator 6. Thus, the electrical storage device 16 is charged or discharged in accordance with a difference of the engine output power with respect to the travel power of the hybrid vehicle 100A. It should be noted that the electric power of the motor generator 10 generated by the regenerative brake can also be collected by the electrical storage device 16 in the series HV travel.

Figure 17:
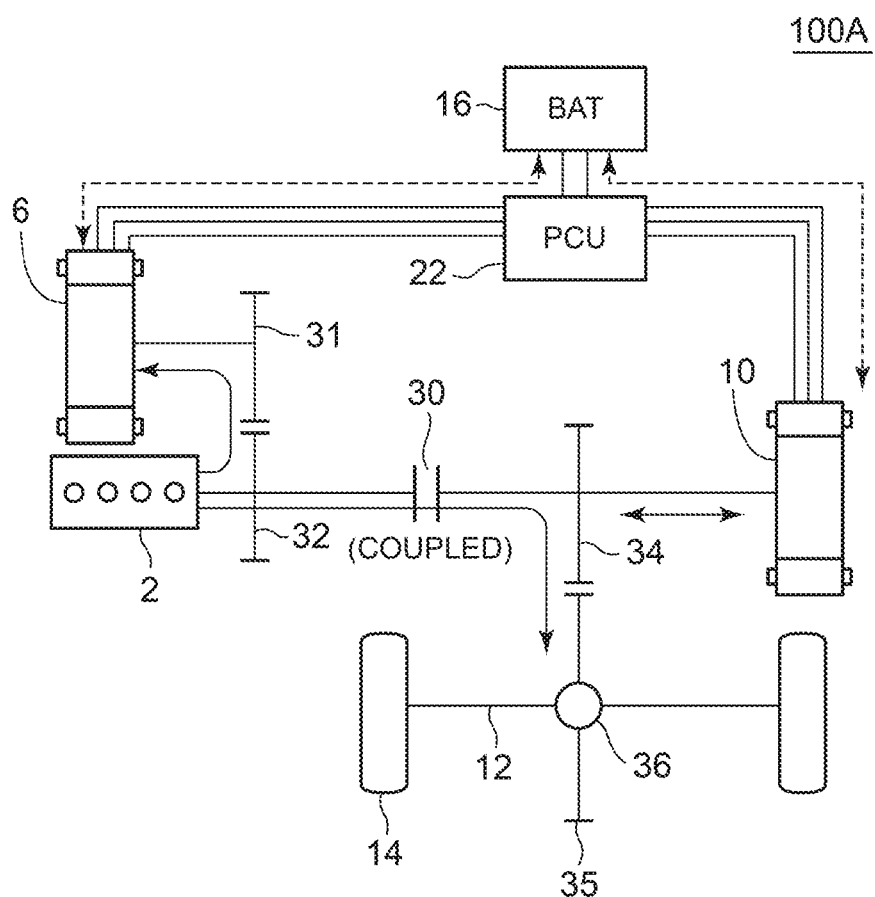
FIG. 17 is a block diagram for explaining a power transmission path in a parallel HV travel.

FIG. 17 is a block diagram for explaining a power transmission path in the parallel HV travel.

With reference to FIG. 17, in the parallel HV travel, the engine 2 is actuated, and the clutch 30 is controlled in the coupling state. Accordingly, the output of the engine 2 is transmitted to the drive wheels 14. Furthermore, the output of the motor generator 10 is also transmitted to the drive wheels 14. Thus, in the parallel HV travel, the hybrid vehicle 100A travels by the output of the engine 2 or by the output of the engine 2 and the motor generator 10.

It should be noted that, when the engine output power is excessive with respect to the travel power in the parallel HV travel, the motor generator 6 and/or 10 generate(s) the electric power by using the excessive power, and thereby the charged electric power is generated in the electrical storage device 16. On the other hand, when the engine output power is short with respect to the travel power, the motor generator 10 assists the vehicle drive power by using the discharged electric power from the electrical storage device 16. That is, also in the parallel HV travel, the electrical storage device 16 is charged or discharged in accordance with the difference of the engine output power with respect to the travel power of the hybrid vehicle 100A. It should be noted that the electric power of the motor generator 10 generated by the regenerative brake can also be collected by the electrical storage device 16 in the parallel HV travel.

In the parallel HV travel shown in FIG. 17, a transmission gear ratio between the engine 2 and the drive wheels 14 is fixed. Accordingly, the engine speed is uniformly determined with respect to the vehicle speed. Thus, a degree of freedom in setting of the operation point of the engine 2 is decreased. On the other hand, in the series HV travel shown in FIG. 18, the power is not transmitted between the engine 2 and the drive wheels 14. Thus, there is no limitation between the vehicle speed and the engine speed, and the degree of freedom in setting of the operation point of the engine 2 is high.

Meanwhile, in the series HV travel, all of the output of the engine 2 (mechanical energy) is used as the vehicle drive power in conjunction with conversion into the electrical energy. Accordingly, transmission efficiency is lowered due to loss by conversion between the mechanical energy and the electrical energy. On the other hand, in the parallel HV travel, at least some of the output of the engine 2 is used as the vehicle drive power without being converted into the electrical energy. Thus, the transmission efficiency (use efficiency) of the engine output becomes higher in the parallel HV travel than in the series HV travel.

As described above, an improvement effect of the fuel economy of the hybrid vehicle 100A is significant when the engine efficiency can be increased in the parallel HV travel in which the use efficiency of the engine output is high. Meanwhile, in the parallel HV travel, a problem of how to increase the engine efficiency with the low degree of freedom in setting of the engine operation point is raised.

Figure 18:
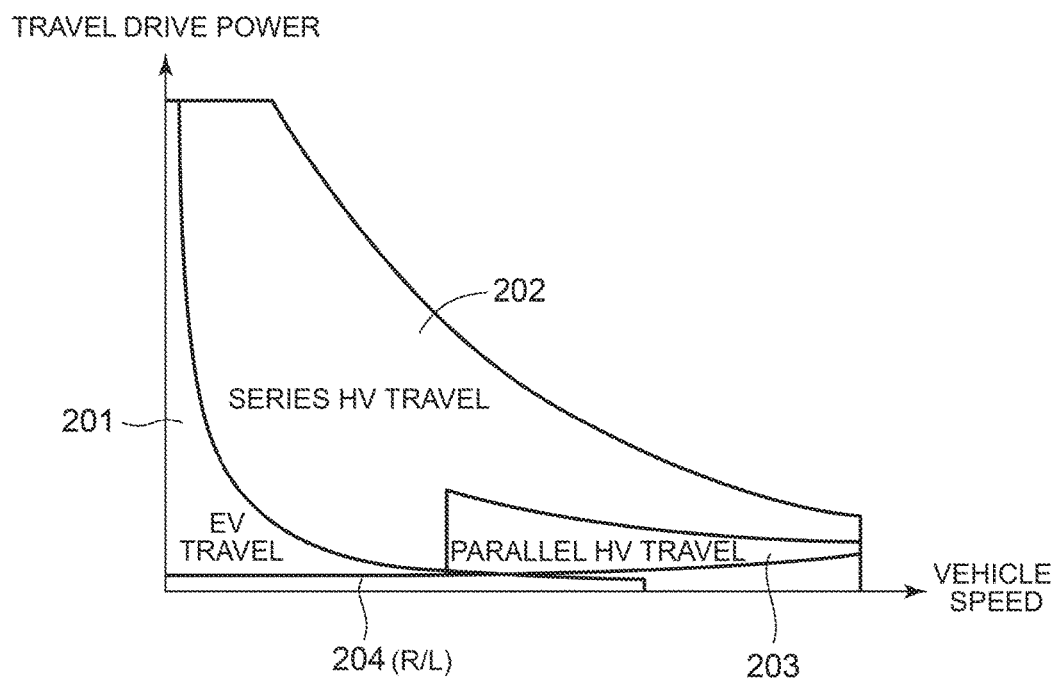
FIG. 18 is a conceptual chart for showing one example of switching of the travel mode in accordance with a travel situation in the hybrid vehicle.

FIG. 18 is a conceptual chart for showing one example of switching of the travel mode in accordance with the travel situation in the hybrid vehicle 100A. With reference to FIG. 18, a horizontal axis of FIG. 18 indicates the vehicle speed of the hybrid vehicle 100A, and a vertical axis thereof indicates the travel drive power (torque) of the hybrid vehicle 100A.

The travel power of the hybrid vehicle 100A is computed from a product of the travel drive power (the torque) shown in FIG. 18 and a rotational speed of the output gear 34 shown in FIG. 14.

For example, the ECU 26A prepares an EV travel region 201, a series HV travel region 202, and a parallel HV travel region 203 in order to switch the travel mode in accordance with the travel situation. At each interval of the travel control, the ECU 26A selects the travel mode in accordance with whether a current combination of the vehicle speed and the travel drive power is within any of the travel regions 201 to 203.

The EV travel is schematically selected in a low-output region at a low speed and with a low load. In this way, the deterioration of the fuel economy by a low-load operation of the engine 2 can be avoided. It should be noted that the travel drive power and the vehicle speed are substantially and inversely proportional to each other on a boundary line of the EV travel region 201 in a curve shape. Thus, in the EV travel region 201, the travel power is equivalently provided so as to correspond to a region in which the travel power is lower than a specified value.

During traveling at an intermediate vehicle speed, the engine 2 is operated intermittently in consideration of balance between the thermal efficiency of the engine 2 and charging/discharging loss of the electrical storage device 16 such that the travel mode is appropriately switched between the EV travel and the series HV travel or between the EV travel and the parallel HV travel. During traveling at a high vehicle speed, the series HV travel and the parallel HV travel are appropriately selected in consideration of the energy transmission efficiency, and the fuel economy can thereby be improved.

In FIG. 18, a travel load line 204 is further indicated in a flat road travel. The travel load line 204 corresponds to collection of the travel drive power (the torque) that is required at each of the vehicle speeds in the case where the hybrid vehicle 100A travels on a flat road at a constant vehicle speed.

Figure 19:
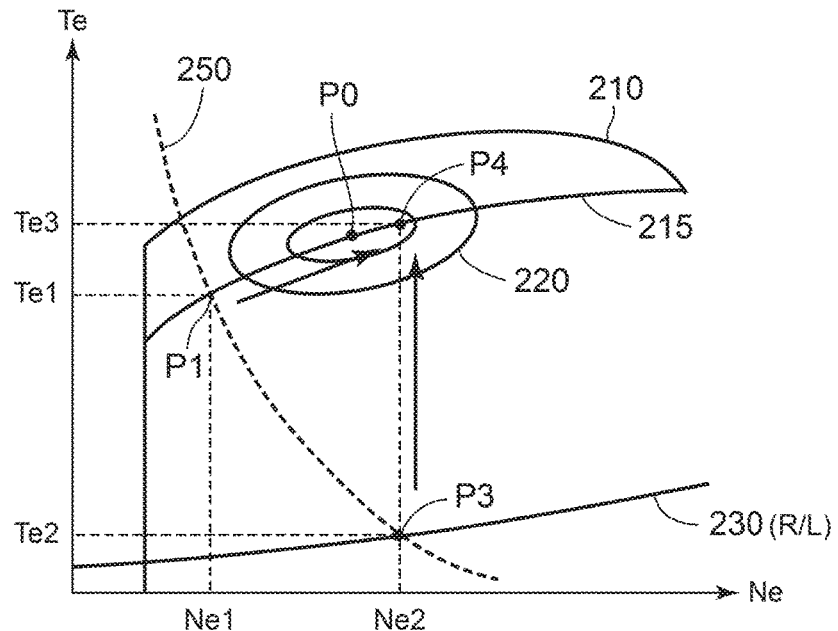
FIG. 19 is a conceptual chart for explaining a relationship between the engine operation point and the efficiency.

FIG. 19 is a conceptual chart for explaining a relationship between the engine operation point and the efficiency shown in FIG. 14. With reference to FIG. 19, a horizontal axis of FIG. 19 indicates the engine speed, and the vertical axis thereof indicates the engine torque. As described above, the operation point of the engine 2 is defined by the combination of the engine speed and the engine torque.

In FIG. 19, the maximum torque line 210 and the constant fuel economy line 220 are indicated. In FIG. 19, a travel load line 230 is further indicated. A torque value at each of the engine speeds on the travel load line 230 balances the travel resistance during the flat road travel at the constant vehicle speed in accordance with said engine speed of the hybrid vehicle 100A. That is, the travel load line 230 corresponds to collection of the operation points for outputting the engine torque that balances the travel resistance during the flat road travel.

Here, a case where the hybrid vehicle 100A travels on a flat road at the constant vehicle speed without involving charging/discharging of the electrical storage device 16 is considered. The operation point at which the engine 2 outputs the travel power in this case is located on the travel load line 230. In the parallel HV travel mode, the engine speed is determined in accordance with said constant vehicle speed. Here, it is assumed the engine speed Ne=Ne2. In this case, an operation point P3 (Te=Te2) on the travel load line 230 at which the engine speed becomes Ne2 is the operation point of the engine 2 that does not involve charging/discharging of the electrical storage device 16. The operation point P3 is significantly deviated from the optimum fuel economy operation line 215. Thus, the engine efficiency is lowered.

Meanwhile, in order to obtain the same engine output power as that at the operation point P3 in the series HV travel, the operation point P1 that corresponds to a crossing point of the constant power line 250 that includes the operation point P3 and the optimum fuel economy operation line 215 can be selected. The engine efficiency at the operation point PI is higher than the engine efficiency at the operation point P3.

However, in the parallel HV travel, such control that the engine output power to be higher than the travel power is set and this power difference is absorbed by charging of the electrical storage device 16 is also possible. For example, the engine output can be increased such that the engine output power moves from the operation point P3 to the operation point P4. That is, it can be expected to increase the engine efficiency in the parallel HV travel by increasing the degree of freedom of charging/discharging, in particular, charging of the electrical storage device 16.

Accordingly, in the hybrid vehicle 100A according to the second embodiment, the SOC recovery control is executed in the parallel HV travel. Thus, in the parallel HV travel, the charging/discharging requested power Pchg is set to Pchg<0 until the SOC reaches the target SOC. For this reason, the engine requested power Pe can be increased to be higher than the travel power Pr*, and thus the engine operation point can be set in FIG. 19 so as to increase the engine efficiency. This is equivalent to changing of the engine output power such that the engine operation point approaches P4 from P3 in FIG. 19.

In this way, the SOC recovery control is executed when the engine 2 is operated at the engine operation point at which the energy efficiency (the charging efficiency) for charging the electrical storage device 16 is increased. Accordingly, the travel cost at the time when the EV travel is made by using the electric power that is charged on the freeway (a first travel cost RC1) can be reduced. Thus, the total travel cost of the hybrid vehicle 100A can be reduced.

Figure 20:
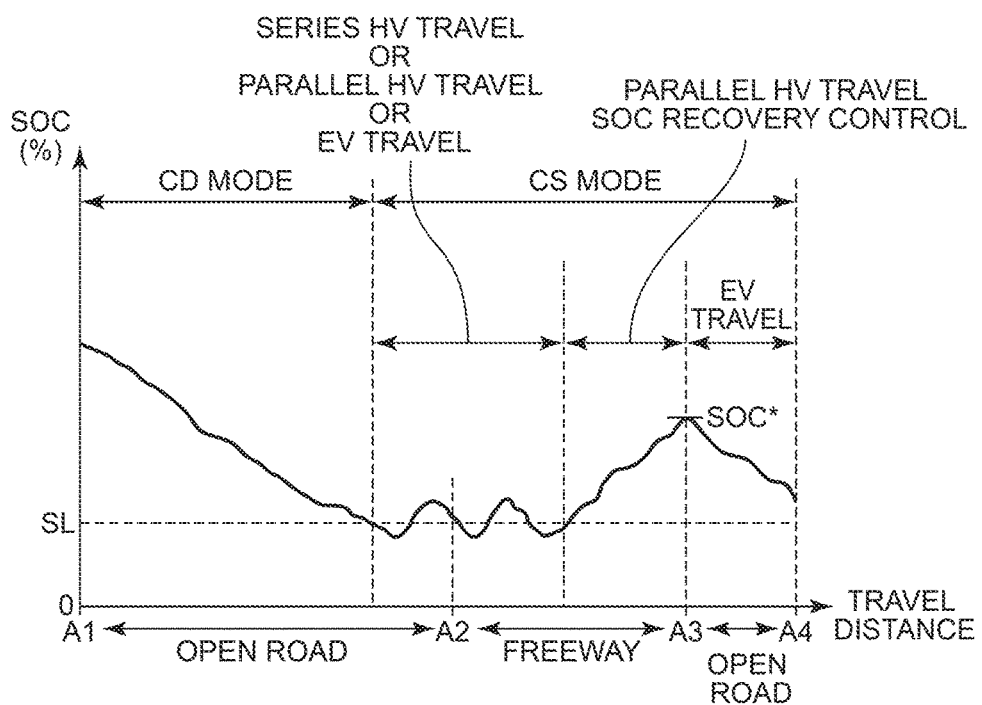
FIG. 20 is a schematic waveform chart for showing one example of transitions of the modes and the SOC when the hybrid vehicle travels on the route like that shown in FIG. 3.

FIG. 20 shows one example of the transitions of the modes and the SOC when the hybrid vehicle 100A travels on the route like that shown in FIG. 3. In FIG. 20, a horizontal axis indicates the travel distance, and a vertical axis indicates the SOC.

With reference to FIG. 20, the CD mode is selected and a travel starts at the departure point A1. During traveling in the CD mode, when the SOC<SL in the section from the point A1 to the point A2, the hybrid vehicle 100A is switched from the CD mode to the CS mode.

In the section from the point A2 to the point A3 (the freeway), the hybrid vehicle 100A travels in the CS mode. As shown in FIG. 20, during traveling in the CS mode, the hybrid vehicle 100A travels by switching among the EV travel (FIG. 14), the series HV travel (FIG. 15), and the parallel HV travel (FIG. 16) in accordance with the travel situation.

During traveling on the freeway, the ECU 26A executes the SOC recovery control for increasing the SOC of the electrical storage device 16 to the target value. In order to execute the SOC recovery control, the ECU 26A selects the parallel HV travel. In the SOC recovery control, the engine 2 is constantly actuated such that the SOC reaches the target SOC (the SOC*) when the hybrid vehicle 100A passes the point A3 as the exit of the freeway.

Then, in the section from the point A3 as the exit of the freeway to the destination point A4 (the open road), the hybrid vehicle 100A selects the EV travel. That is, during traveling in the section from the point A3 to the point A4 (the open road), the actuation of the engine 2 for charging the electrical storage device 16 is avoided. Thus, the frequencies of the EV travel are increased.

The travel control of the hybrid vehicle 100A that is executed in the second embodiment is basically the same as the travel control of the hybrid vehicle 100 that is executed in the first embodiment. However, as the first travel cost, a travel cost at a time when the EV travel is made by using the electric power charged in the electrical storage device 16 when the parallel HV travel on the freeway is made is computed. The first travel cost can be computed by dividing the cost of the fuel that is used to charge the electrical storage device 16 when the hybrid vehicle 100A makes the parallel HV travel at the legal speed (for example, 100 km per hour) of the freeway by an EV travel permissible distance by using the electric power stored in the electrical storage device 16 in the parallel HV travel.

In addition, in the second embodiment, in the case where the first travel cost is equal to the second travel cost, the target SOC of the SOC recovery control is set to the default value (for example, 70%), and the SOC recovery control is executed when the engine 2 is operated at the high-efficiency operation point during traveling on the freeway in the parallel HV travel.

Just as described, according to the hybrid vehicle according to the second embodiment, in the case where the travel route to the destination includes the freeway and the open road from the exit of the freeway to the destination, the SOC recovery control is executed during traveling on the freeway in the parallel HV travel such that the SOC of the electrical storage device reaches the target SOC when the hybrid vehicle passes the exit of the freeway, and the EV travel is made on the open road by using the electric power stored in the electrical storage device. In this way, compared to the case where the hybrid vehicle travels on both of the freeway and the open road in the CS mode, the travel cost can be reduced.

Furthermore, the target SOC in the SOC recovery control that is executed during traveling on the freeway is set on the basis of the comparison result between the travel cost at the time when the EV travel is made by using the electric power charged in the electrical storage device in the parallel HV travel on the freeway (the first travel cost) and the travel cost at the time when the EV travel is made by using the electric power charged in the electrical storage device by the external charging at the destination (the second travel cost). In this way, the charging cost of the hybrid vehicle can be reduced. Therefore, the total travel cost of the hybrid vehicle can be reduced.

It should be noted that, in the above-described embodiment, the configuration for setting the target SOC in the SOC recovery control that is executed during traveling on the freeway on the basis of the destination and the travel route from the current spot to the destination when it is determined that the hybrid vehicle is in the "READY-ON" state has been exemplified (see FIG. 10). However, timing at which the process for setting the target SOC is executed is not limited thereto. The process for setting the target SOC may be executed from a time at which the hybrid vehicle starts traveling to a time at which the hybrid vehicle starts traveling on the freeway.

The embodiments disclosed herein are illustrative in all respect and thus should not be considered as restrictive. The scope of the claimed subject matter is not indicated by the above description but indicated by the scope of the claims and is intended to include all changes that are equivalent in meaning and within the scope of the claims.

What is claimed is:

1. A hybrid vehicle able to be charged by using electric power from a power supply on the outside of the hybrid vehicle, the hybrid vehicle comprising:
    an internal combustion engine;
    an electrical storage device;
    a motor mechanically coupled to a drive wheel, the motor configured to generate travel drive power by receiving the electric power from the electrical storage device;
    an electric power generator mechanically coupled to the internal combustion engine, the electric power generator configured to generate electric power to be charged to the electrical storage device by using power of the internal combustion engine;
    a charging mechanism configured to charge the electrical storage device by using electric power from the power supply on the outside of the hybrid vehicle; and
    an electronic control unit configured to switch between an electric vehicle (EV) travel and an hybrid vehicle (HV) travel in accordance with a travel situation of the hybrid vehicle, the electronic control unit being configured to stop the internal combustion engine and cause the hybrid vehicle to travel by output of the motor in the EV travel, the electronic control unit configured to cause the hybrid vehicle to travel by actuating the internal combustion engine in the HV travel, and the electronic control unit configured to:
        set a target value of a charging amount of the electrical storage device, the target value being a target value at a time when the hybrid vehicle passes an exit of a freeway in a case where a travel route to a destination includes the freeway and an open road from the exit of the freeway to the destination,
        execute charging amount recovery control for increasing the charging amount of the electrical storage device to the target value when the hybrid vehicle travels on the freeway,
        compute a first travel cost and a second travel cost, the first travel cost being a monetary cost per unit travel distance of fuel used when the hybrid vehicle travels in the EV travel by using the electric power charged in the electrical storage device at a time when the hybrid vehicle travels on the freeway in the HV travel, the second travel cost being a monetary cost per unit travel distance of the electric power used when the hybrid vehicle travels in the EV travel by using the electric power charged in the electrical storage device by the charging mechanism at the destination, and
        set the target value in the charging amount recovery control on the basis of a comparison result between the first travel cost and the second travel cost, wherein in a case where the first travel cost is lower than the second travel cost, the electronic control unit is configured to set the target value such that the electrical storage device is brought into a full charge state when the hybrid vehicle passes the exit of the freeway.

2. The hybrid vehicle according to claim 1, wherein in a case where the first travel cost is higher than the second travel cost, the electronic control unit is configured to set the target value such that an electric power amount required for the hybrid vehicle to travel on the open road in the EV travel is stored in the electrical storage device when the hybrid vehicle passes the exit of the freeway.

3. The hybrid vehicle according to claim 1, wherein in a case where the first travel cost is equal to the second travel cost, the electronic control unit executes the charging amount recovery control when the hybrid vehicle travels on the freeway and when the internal combustion engine is operated at an operation point at which energy efficiency of the internal combustion engine becomes at least equal to a specified threshold.

4. The hybrid vehicle according to claim 1, further comprising a switching unit configured to be able to switch either to a coupling state in which a mechanical power transmission path between the internal combustion engine and the drive wheel is established or to a blocking state in which the mechanical power transmission path is blocked, wherein
    in a series HV travel, the electronic control unit is configured to control the switching unit to be in the blocking state and actuate the internal combustion engine so as to cause the hybrid vehicle to travel by using output of the motor in conjunction with electric power generation by the electric power generator,
    in a parallel HV travel, the electronic control unit is configured to control the switching unit to be in the coupling state and actuate the internal combustion engine so as to cause the hybrid vehicle to travel by using at least some of output of the internal combustion engine,
    the electronic control unit is configured to control the switching unit to be in the blocking state in the EV travel, the electronic control unit is configured to switch between the series HV travel and the parallel HV travel in the HV travel, the electronic control unit configured to execute the charging amount recovery control by selecting the parallel HV travel when the hybrid vehicle travels on the freeway, and the electronic control unit configured to compute, as the first travel cost, cost per unit travel distance of the fuel used when the hybrid vehicle travels in the EV travel by using the electric power charged in the electrical storage device at a time when the hybrid vehicle travels on the freeway in the parallel HV travel.

\* \* \* \* \*